July 9, 1957　　　　　R. MOREL　　　　2,799,002
SYSTEM OF EXCITATION AND OF REGULATION OF THE
OUTPUT POTENTIAL OF ELECTROSTATIC GENERATORS
Filed Sept. 12, 1955　　　　　　　　　　　　7 Sheets-Sheet 4

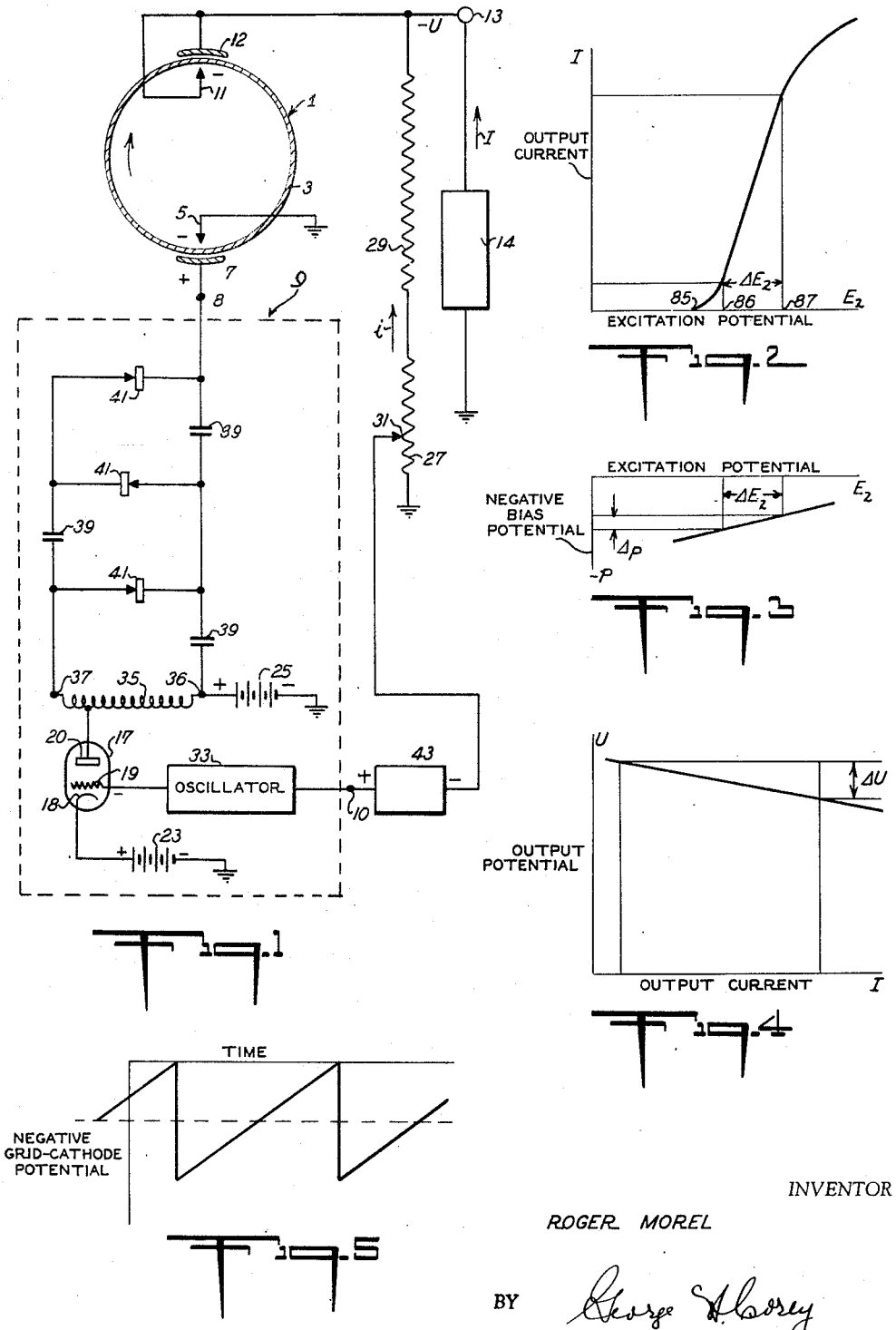

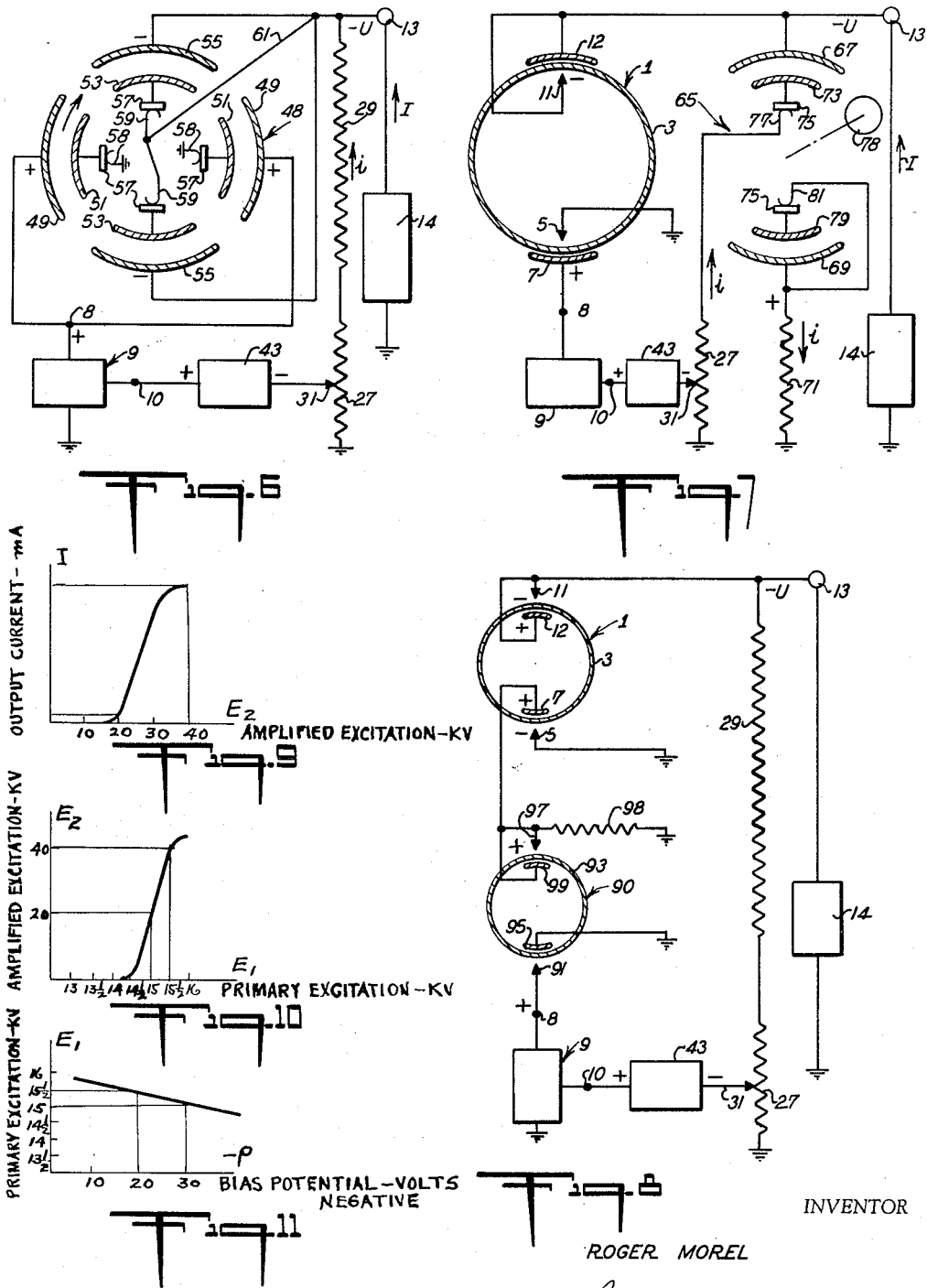

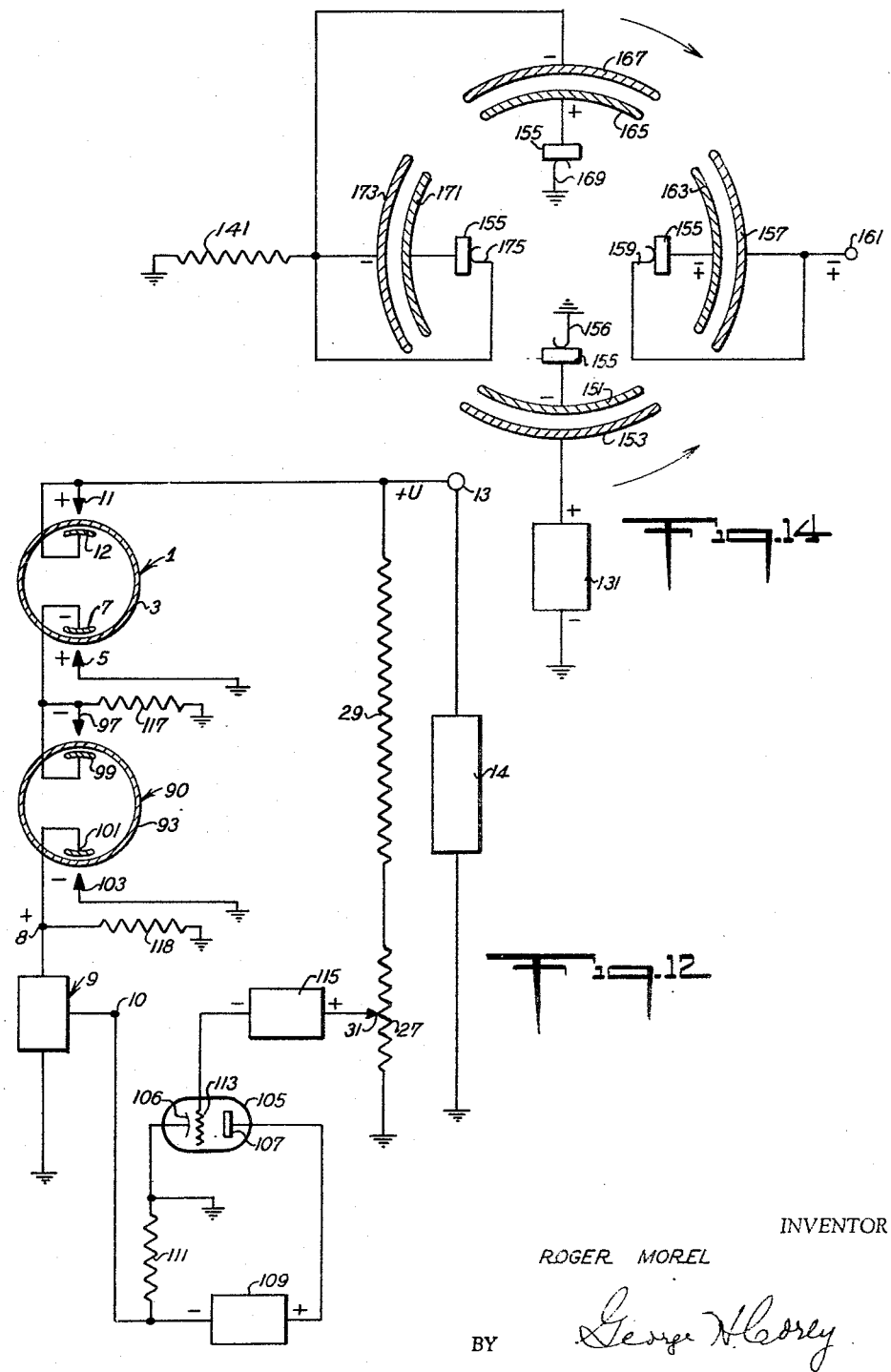

INVENTOR
ROGER MOREL
BY George N. Carey
ATTORNEY

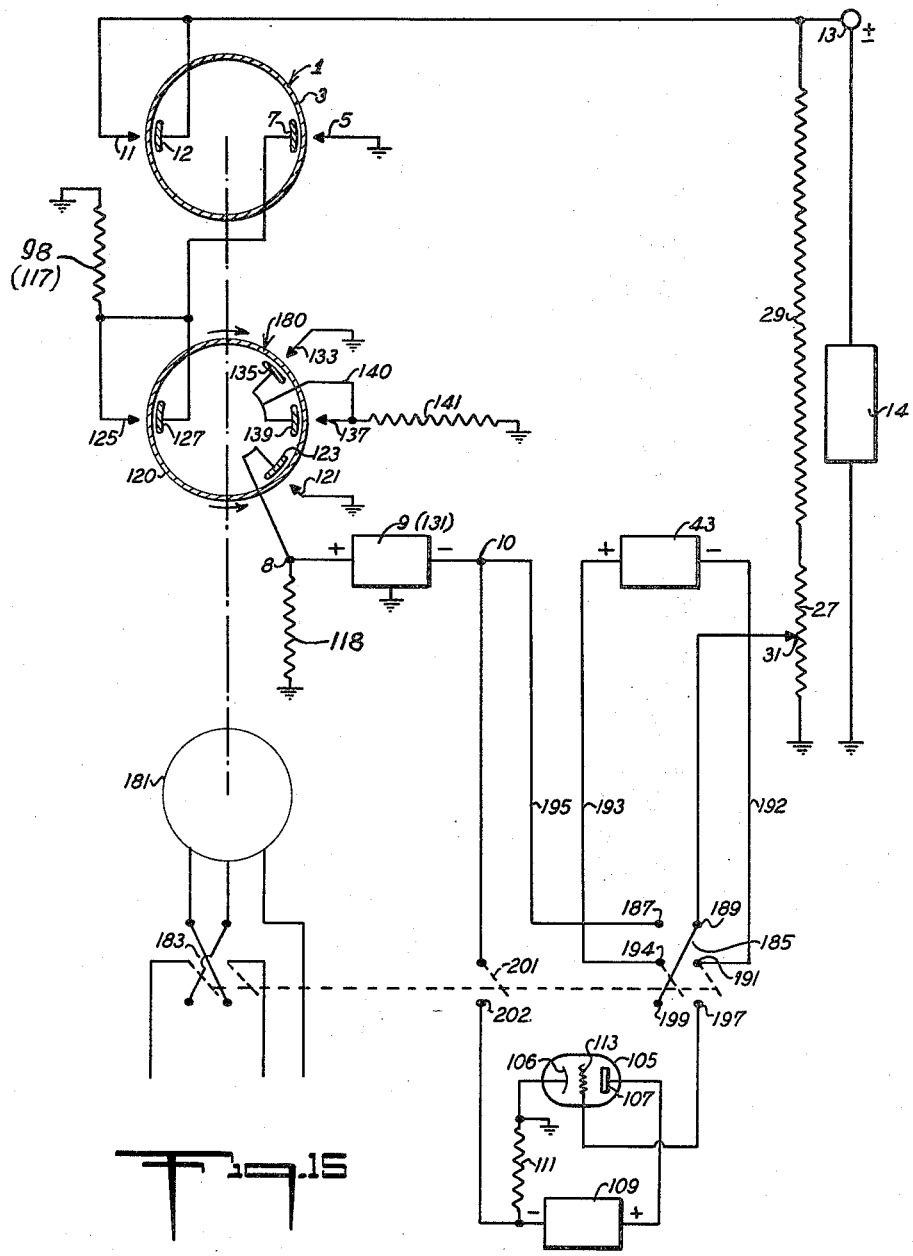

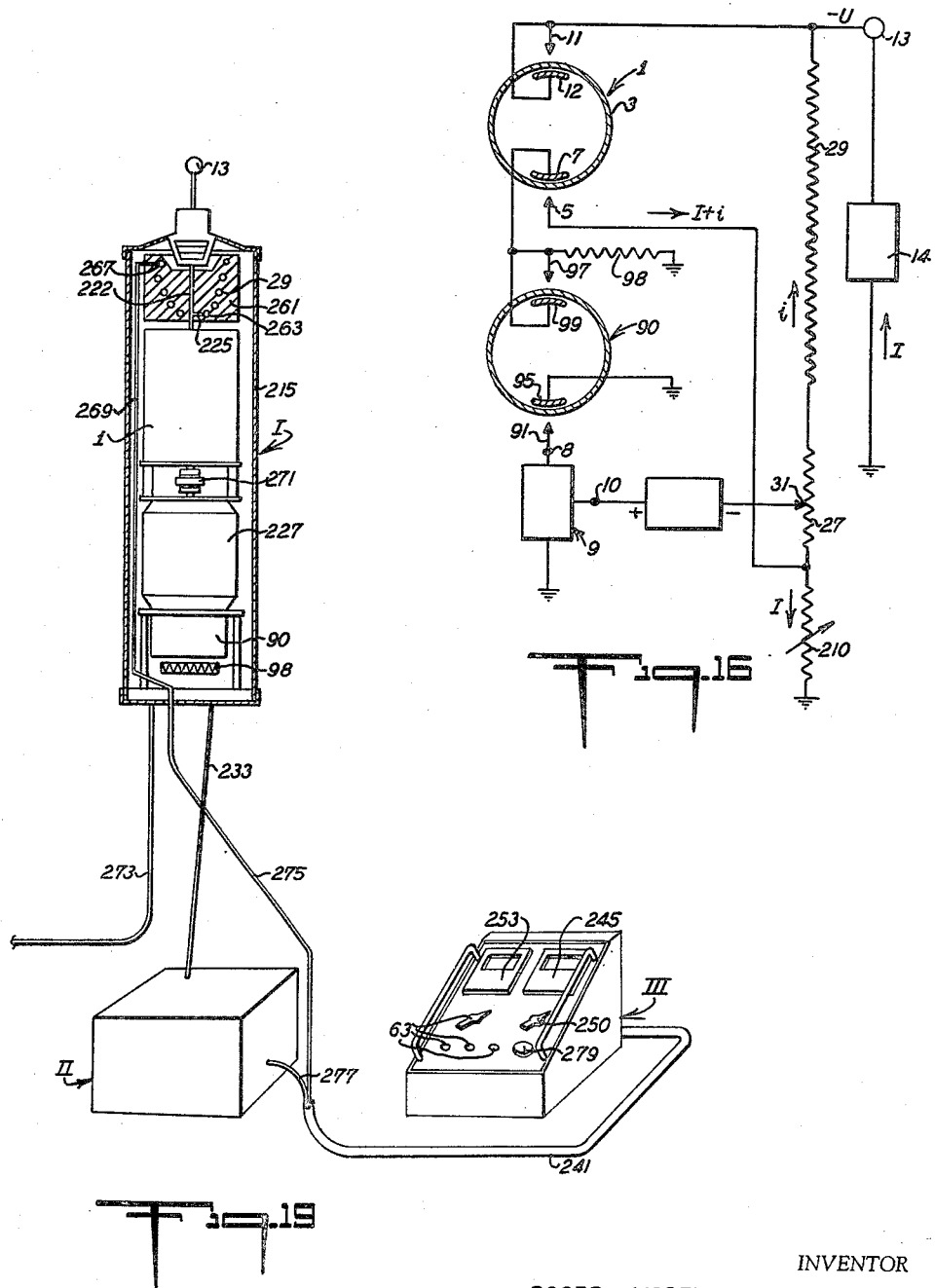

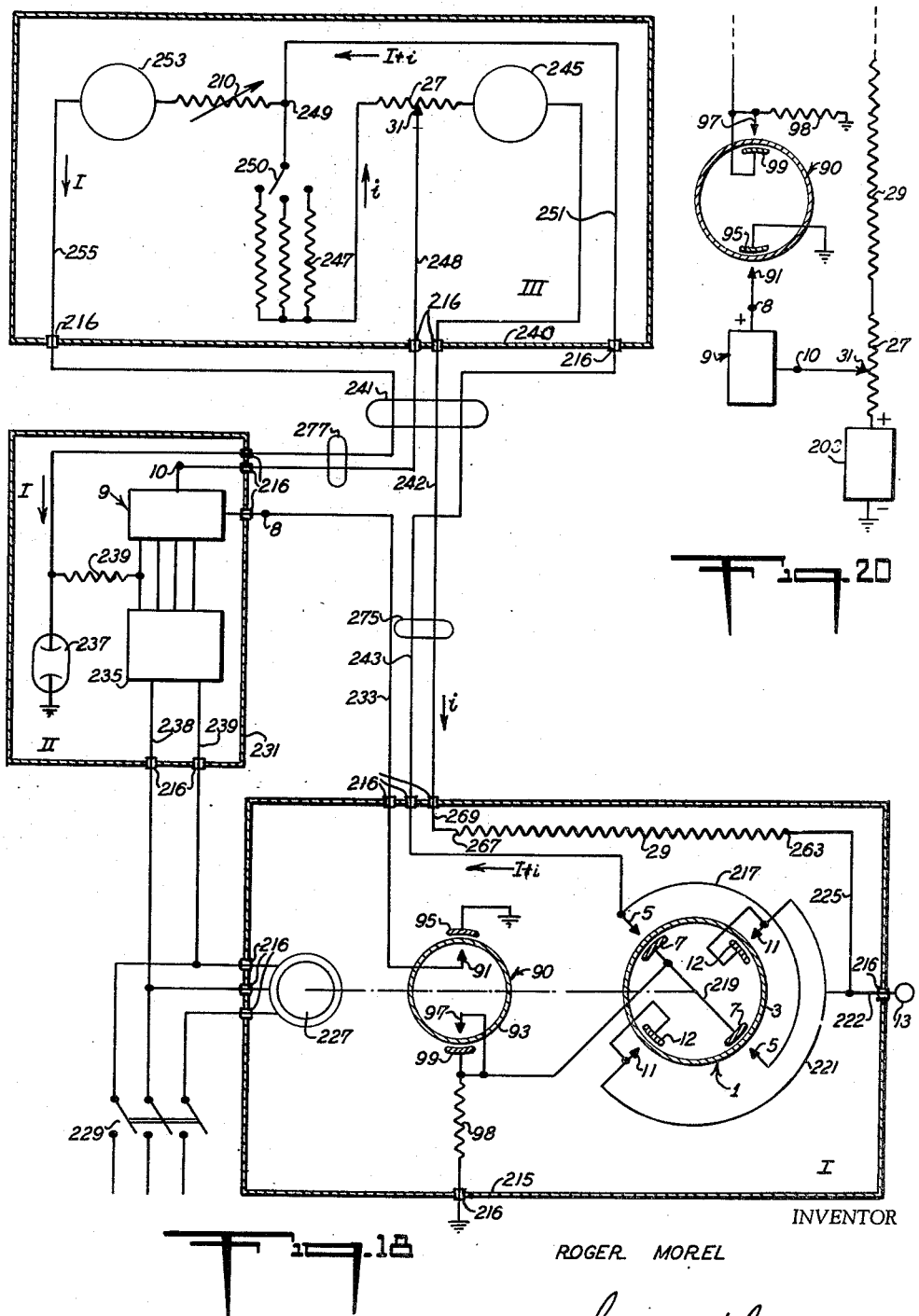

United States Patent Office 2,799,002
Patented July 9, 1957

2,799,002

SYSTEM OF EXCITATION AND OF REGULATION OF THE OUTPUT POTENTIAL OF ELECTROSTATIC GENERATORS

Roger Morel, Grenoble, France, assignor to Societe Anonyme de Machines Electrostatiques, Grenoble, France, a corporation of France Application September 12, 1955, Serial No. 533,581

Claims priority, application France September 13, 1954

33 Claims. (Cl. 322—2)

This invention relates to a system for electrostatic generation and more especially to a system for exciting and controlling the output potential of electrostatic generating apparatus. The invention particularly relates to a system and apparatus for regulating the output potential of an electrostatic generator in response to variations of this output potential caused by variations in the load or by other cause.

Various devices have been proposed for providing an electrostatic generator with a characteristic such that the output potential is substantially constant with variations in the output current or charge. For the most part these devices have been utilized in connection with electrostatic generators having an insulating belt such as are used to provide the requisite potential for particle accelerating tubes for which it is necessary to obtain a stable potential and an extremely short time period of response to variations. The apparatus which have been proposed for such regulation in general are quite complicated.

It is an object of the invention to provide an electrostatic generating system with good regulation of such form as to have practical utility and industrial application.

It is another object of the invention to provide such a system which is simple and of moderate cost.

It is a further object of the invention to utilize in such a system devices and members which are of conventional construction.

It is another object of the invention to provide for regulating the output potential of electrostatic machines of a considerable range of power output.

The invention is particularly concerned with electrostatic generators for producing high output potential. Within the scope of the invention the electrostatic generator may be one which has a conductive conveyor or one which has an insulating conveyor. The electrostatic generator of the invention may have an input electrode disposed adjacent a path of movement of a conveyor, the generator also providing an output electrode spaced along the path of movement of the conveyor from the input electrode. These electrodes are disposed in relation to the conveyor path so that charges are transferred to the conveyor at the input electrode and are conveyed by the conveyor to and transferred to the output electrode. In general the electrostatic generators of the invention utilize an inductor electrode disposed adjacent the input electrode and cooperating therewith and with the conveyor to effect the transfer of charges to the conveyor. Means to be described are provided which embody important features of the invention for securing the cooperation of the input inductor electrode with the charge input electrode so that the desired transfer of charges to the conveyor to be conveyed to the output electrode is effected.

When an electrostatic generator is utilized which provides an insulating conveyor by means which embody important features of the invention an electric field is established between an input inductor member and an ionizer and ions will be transferred to the adjacent wall surface of the conveyor to be conveyed to an output electrode. An ionizer also is provided adjacent and in spaced relation to the same surface adjacent which the input ionizer is disposed. The generator may be similar to that disclosed in the French patent to Felici, No. 1,051,430, publié January 15, 1954, and in the U. S. application Serial No. 492,491 filed March 7, 1955.

When the electrostatic generator utilized in the invention is of the type having a conductive conveyor, the conveyor or conveyor members may be rotatable on a shaft into and out of inductive relation to the inductor members as disclosed, for example, in the U. S. patent to Felici, No. 2,530,193, issued November 14, 1950.

It is an important feature of the invention, in order to accomplish the objects above stated, that means are provided which are responsive to variations in the output potential of the electrostatic generator and which are effective to regulate this output potential. In order to accomplish this purpose, the apparatus of the invention utilizes means which is responsive to variations in the potential difference between the output electrode or terminal of the electrostatic generator and an input electrode thereof. This means is capable of developing a potential difference varying in inverse relation to the difference of potential between the output terminal and the input electrode. This means cooperates with means for multiplying this inversely related potential difference and producing therefrom a unidirectional potential difference having a predetermined polarity with respect to the polarity of the output electrode. This last means which produces the unidirectional potential difference of predetermined polarity may be connected to the charge input electrode referred to above but preferably is connected to the input inductor electrode of the electrostatic generator. Such connection is selected having regard to the desired polarity of the output potential difference of the electrostatic generator so that the charges which are developed on the conveyor by the cooperation of the input inductor electrode and the charge input electrode will be of the proper polarity to be delivered to the output electrode or terminal. By virtue of the inverse relation referred to and having regard to other control elements to be described more particularly hereinafter, the potential at the output electrode of the generator and the potential difference between this output electrode and one of the input electrodes may be regulated even though changes in the load circuit or other conditions affecting the output potential may occur, and this potential may be controlled within desired and practical limits of variation.

With either type of generator, namely one utilizing an insulating conveyor or one utilizing a conductive conveyor, the regulating system of the invention provides a circuit connected between the output electrode or terminal of the generator and a selected input electrode thereof. In this circuit a resistance is connected. Means also are connected in this circuit between the resistance and the output electrode of the generator which is capable of providing flow of current through the circuit and through the resistance and producing a potential drop across this resistance proportional to the potential difference between the output electrode and the selected input electrode. The means above mentioned cooperating with the inverse potential difference means for multiplying this inversely related potential difference is responsive, therefore, to the variations of the potential drop across the resistance and is capable of multiplying this potential drop and also of determining the polarity of the unidirectional potential difference, so that the output terminal of this means which produces the multiplied unidirectional potential difference may be connected either to the input inductor electrode or to the charge input electrode of the electrostatic generator to determine the polarity of the charge to be transferred to the conveyor of the electrostatic generator.

It is a significant aspect of this feature of the invention that an amplifying electrostatic generator may be provided utilizing the unidirectional potential difference that is in inverse relation to the output potential difference of the electrostatic generator, this amplifying generator further amplifying the potential difference which may be applied across the input electrodes of the electrostatic generator. As will be understood from more detailed description to follow, the polarity of the output terminal of this amplifying generator may be determined and it may be so connected to the electrostatic generator as to secure the desired polarity of the output potential of the electrostatic generator. This amplifying electrostatic generator may be of either type, namely, one having an insulating conveyor or one having a conductive conveyor.

As will be described more particularly hereinafter also, it is another important feature of the invention that polarity determining means are used which are capable of determining the polarity of the output electrode of the generator by selective forward and reverse operation of the polarity determining means. Such reversal may be accomplished at will. This polarity determining means thus operable at will may have the general form of an electrostatic generator of either type above referred to, that is, one utilizing an insulating conveyor or one utilizing a conductive conveyor, and may be constructed as an amplifying generator and operated so that it amplifies the inversely related potential difference derived from the potential drop across the resistance above referred to. Such a polarity determining and amplifying generator may be used in combination with the means connected to the resistance for multiplying the inversely related potential difference to produce a multiplied and amplified potential difference for developing between the two input electrodes of the main electrostatic generator the charge transfer conditions above referred to for transferring charges to the conveyor selectively with different polarities to secure selectively negative and positive polarity at the output electrode of the electrostatic generator.

The construction and characteristics of this reversible electrostatic generator of selective polarity constitute an additional important feature of the invention as will be clear from the more detailed description to follow.

It is a further important feature of the invention that devices are provided which cooperate with the multiplying means and with the amplifying generator for multiplying and amplifying the variations in the potential drop across the resistance above mentioned so that greater and more sensitive control effect is secured at the input electrodes of the electrostatic generator for controlling the charge transferring conditions at these input electrodes. These auxiliary and supplemental devices are effective to secure an increased percentage of multiplication and an increased percentage of amplification as compared with variations in the potential drop across the resistance from which they are derived, with the result that small variations in the potential drop across the resistance resulting from variations in the output potential difference are multiplied and amplified so as to be quickly and sensitively effective to offset the variations in the output potential difference and to restore the desired or normal output potential.

As will be more clearly understood from the description to follow in connection with the drawings, the invention provides a bias potential which is derived from and is responsive to variations in the potential drop across the resistance above referred to and, therefore, to the variations in the output potential difference. This bias potential is utilized with means which may be provided by conventional devices, including conventional electronic devices, such as a triode, so that the potential difference developed by the multiplying means varies inversely in relation to the variation in the potential drop across the resistance. Where the output electrode potential of the main generator is negative, the negative potential derived from the resistance may be carried to the grid of a triode to oppose the electron flow with different degrees of effect depending upon the negative value of the derived potential. This opposing effect in the triode develops the inverse relation above referred to. Means are utilized in connection with such a device for multiplying and concomitantly rectifying the alternating potential difference produced so that a unidirectional potential difference is available at the output terminals of this arrangement of electrical devices for connection to a selected one of the input electrodes of the electrostatic generator.

Where the output potential of the electrostatic generator is to be positive, similar apparatus may be utilized with additional means which is effective to determine the requisite polarity of the potential difference which is applied to the input electrodes of the electrostatic generator so that the desired polarity at the output terminal of this electrostatic generator is secured.

Other objects and features of the invention will be more clearly understood from the description of the drawings to follow in which:

Fig. 1 shows schematically an arrangement of the control circuits and devices which function to regulate the output potential of an electrostatic generator having an insulating conveyor.

Fig. 2 is a curve showing the relation of the excitation potential difference at the input electrodes to the output current of the electrostatic generator.

Fig. 3 is a curve showing the requisite change in the bias potential to be applied to the means developing the unidirectional potential difference in order to control the potential difference at the input electrodes so as to regulate the output potential difference and maintain the generally constant output potential.

Fig. 4 is a curve showing the relation of the output potential difference to the output current of the electrostatic generator.

Fig. 5 is a curve showing the variation in the potential difference between the grid and the cathode of the electronic tube shown in Fig. 1.

Fig. 6 shows schematically the arrangement of the control circuits and devices for regulating the output potential difference of an electrostatic generator having a conductive conveyor.

Fig. 7 shows the circuits and arrangement similar to Fig. 1 for regulating the output potential of an electrostatic generator having an insulating conveyor in which the means providing the flow of current through the control resistance is of modified form.

Fig. 8 shows an electrostatic generating system utilizing an amplifying generator and developing a negative output potential.

Fig. 9 shows a curve giving the input potential difference of the electrostatic generator in relation to the output current thereof in Fig. 8.

Fig. 10 shows a curve giving the relation between the input potential difference of the electrostatic generator and the input potential difference of the amplifying generator in Fig. 8.

Fig. 11 shows a curve giving the relation of the bias potential to the input potential difference of the amplifying generator in Fig. 8.

Fig. 12 shows a system similar to that of Fig. 8 but including devices for insuring a positive output potential.

Fig. 13 shows an electrostatic generator constructed for developing a potential difference selectively of opposite polarities depending upon the direction of rotation of the conveyor of insulating material in this generator.

Fig. 14 shows an electrostatic generator constructed for developing a potential difference selectively of opposite polarities depending upon the direction of rotation of the conveyor of conductive material in this generator.

Fig. 16 shows a system similar to that of Fig. 8 but including means for modifying the regulation secured in accordance with the amount of the current supplied by the main electrostatic generator to the load device, with provision of means for adjusting the control to secure the desired characteristic of the output potential of the electrostatic generator.

Fig. 18 shows diagrammatically an arrangement of the elements of Fig. 16 in three groups, together with certain supplementary devices, for a practical commercial apparatus.

Fig. 19 shows somewhat schematically, partially in perspective and partially in section, the three groups of the apparatus diagrammatically shown in Fig. 18.

Fig. 20 shows a portion of a system similar to that of Fig. 8 but somewhat modified.

Figure 15:
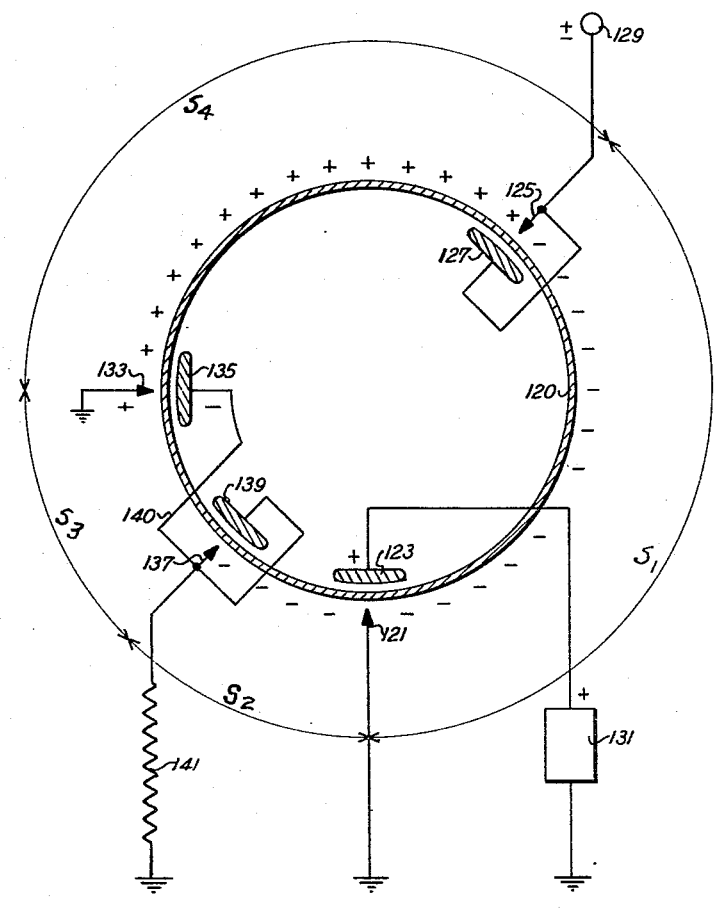
Fig. 15 shows a system utilizing the reversible generator of Fig. 13 together with control means for effecting the reversal and auxiliary devices for insuring the proper polarities in the potential multiplying generator.

In the description which follows the potentials will be assumed to be measured with respect to ground potential as zero, except where otherwise noted.

The circuits and arrangement shown in Fig. 1 include an electrostatic generator 1 having a conveyor 3 of insulating material excited by auxiliary means indicated generally by the dotted rectangle for producing a sufficiently high unidirectional potential difference connected across the input electrodes 5, 7 of the electrostatic generator 1 to produce the desired high output potential —U of the electrostatic generator. In the embodiment disclosed the electrostatic generator 1 having an insulating conveyor 3 is provided with an input ionizer electrode 5 connected to ground and an input inductor electrode 7 disposed at opposite faces of the cylindrical conveyor 3 in spaced relation to these faces. The input inductor 7 is connected to a terminal 8 of the primary excitation means 9 at positive potential for exciting the inductor 7 at this positive potential. Upon rotation of the cylindrical conveyor 3 in the direction of the arrow negative charges transferred to the inner surface of the conveyor from the ionizer 5 are carried to and transferred to the output ionizer electrode 11 which is connected to the output inductor electrode 12 and to the output terminal 13 of the electrostatic generator at —U potential. A load device 14 is connected between the output terminal 13 and the ground, that is, between the output terminal 13 and the input ionizer 5 of the electrostatic generator. The electrostatic generator 1 of Fig. 1 may be constructed as described in the French Patent No. 1,051,430, above referred to, the material of high resistivity connecting betwen the input and output inductors of the generator of the patent for simplicity being omitted in the arrangement of Fig. 1.

In order to secure a potential difference across the input electrode 7 and the ionizer 5 of sufficient amount and of the requisite positive polarity and, as well, to provide for the sensitive regulation referred to hereinabove, in the particular embodiment of Fig. 1 the primary excitation means 9 for producing the unidirectional potential difference includes a triode 17 having a cathode 18, a grid 19 and an anode 20. The cathode 18 of the triode 17 may be connected to ground or, as shown in Fig. 1, to a reference potential different from and preferably above ground potential. This reference potential in Fig. 1 is provided by a source of unidirectional potential difference, such as a battery 23, the plus terminal of which is connected to the cathode 18 to raise the potential of the cathode. The triode 17 is connected in a circuit which includes a source of anode-cathode potential difference, such as a battery 25, connected in the circuit connected between the anode 20 of the triode 17 and ground.

In order to effect control of both the polarity and potential difference applied to the inductor electrode 7 and ionizer 5, a resistance 27 is connected in a circuit connected between the output electrode 13 and the charge input electrode or ionizer 5 of the electrostatic generator. In the portion of this circuit between the resistance 27 and the output terminal 13 means is connected for producing flow of current or charge through this circuit and through the resistance 27 which is proportional to the output potential difference for producing a potential drop across the resistance 27 that is proportional to the difference of potential between the output electrode 13 and the input ionizer 5. In the particular embodiment of Fig. 1 this means for proportional current flow is provided by the resistance 29 connected in series with the resistance 27. In this embodiment the resistivity of resistance 29 is substantially greater, preferably many times the resistivity of resistance 27.

In a circuit connected between a tap 31 on the resistance 27 and the grid 19 of the triode an oscillator 33 which may be of conventional construction is connected to produce an undulating potential difference on the grid 19 at, for example, 20 to 300 kilocycles. In the embodiment of Fig. 1 the potential at the tap 31 is negative and the potential applied to the grid 19 also is negative. In Fig. 5 is shown the general characteristic of the undulating potential difference betwen the grid 19 and the cathode 18 plotted against time. The average potential of this curve is negative as indicated by the dotted line in Fig. 5.

In the circuit connected to the anode 20 which includes the battery 25 a coil or auto transformer 35 is connected. Having regard to the characteristic of the undulating potential applied at the grid 19, an alternating current will flow in the coil 35 developing across its outer terminals 36, 37 an alternating potential difference. Connected to these terminals 36, 37 are means functioning as a rectifier and potential multiplier in a circuit which includes the condensers 39 and unidirectional devices 41. These means are connected in a conventional manner to produce an increased potential at the output terminal 8 of the primary excitation means 9 connected to the inductor member 7 as above stated. The alternating potential difference across the terminals 36, 37 thus is multiplied and rectified to provide the requisite high excitation potential at the inductor 7.

In order to increase the sensitivity of the control apparatus, in series with the oscillator 33 and disposed between this oscillator and the tap 31 at the resistance 27, means 43 providing a constant potential and fixed polarity, such as a battery, is connected. In the particular embodiment of Fig. 1 the positive terminal of this battery is connected to the oscillator 33 and the negative terminal to the tap 31 so that the battery subtracts from the potential at the tap 31 and a negative potential is applied to the grid of less numerical value than the negative potential at the tap 31. Thus, for the same value of the potential applied to the grid, the potential difference between the tap 31 and ground must be greater than would be the case if the battery 43 were omitted. It will be understood, moreover, that for a given increase or decrease in the potential at the tap 31 approximately the same increase or decrease of potential will develop at the grid 19 whether or not the battery 43 is connected in circuit. Since the negative potential of the grid 19 is numerically less with the battery in circuit than the negative potential of the tap 31, the percentage change of the potential of the grid is greater than the percentage change at the tap 31. This feature of the construction secures more sensitive regulation of the unidirectional multiplied potential that is applied to the inductor 7.

It is desirable that the potential drop across the resistance 27 shall be only a fraction of the potential difference between the terminal 13 and the input ionizer 5. It will be understood that an increase, for example, in the output potential —U to a greater negative value will develop an increased potential drop across the resistance with a corresponding increase in the negative potential at the tap 31. This action will increase the average of the undulating negative potential, as shown in Fig. 5, applied to the grid 19 with corresponding reduction in the current flowing through the coil 35, with the result that the potential difference developed between the terminals 36, 37 is decreased. The rectifier multiplier circuit connected to these terminals correspondingly will function to produce a decreased output potential at the terminal 8 and at the exciter inductor 7. Upon such reduction of the excitation potential difference between the inductor 7 and the ionizer 5 the negative potential at the output terminal 13 will be reduced.

This regulating action will be understood by reference to Figs. 2, 3 and 4.

Fig. 2 shows the relation of the output current I to the excitation potential $E_2$, the characteristic of an electrostatic generator being such that a relatively large change in the output current is effected by a relatively small change in the excitation potential.

Fig. 3 shows the corresponding relatively small change in the negative bias potential $p$ applied to the grid 19 which is required to secure the requisite change in the excitation potential $E_2$ corresponding to the change in the output current.

In Fig. 4 the characteristic of the generator is such that an increase of the output current corresponds to a reduction of the output potential U and a reduction of the output current corresponds to an increase of the potential U.

With the potential regulating apparatus and system of Fig. 1 a reduction of the numerical value of the negative output potential which would occur with an increase in the output current delivered to the load device 14 would produce a corresponding decreased negative potential applied to the grid of the triode. This will develop a greater potential difference across the terminals 36, 37 of the coil 35 and a corresponding greater potential at the inductor 7 with the resultant increase in the numerical value of the negative potential —U to restore the desired potential.

It will be understood that the several elements of the primary excitation means 9 may be of such form and construction and arrangement that the output potential will increase and decrease sensitively in relation to the corresponding decrease in the negative potential of the grid 19, that is, in relation to the bias potential, as indicated in Figs. 2, 3 and 4.

It will be understood further that it is possible to control the excitation potential at the terminal 8 by varying the potential drop across the resistance 27, which may be accomplished by changing the position of the tap 31 on a variable resistor of conventional type. Ordinarily in an electrostatic machine having an output potential measured in kilovolts, the potential drop across the resistance may be of the degree of a few hundred volts.

Although in the embodiment of Fig. 1 the primary excitation means 9 utilizes devices which are adapted to produce a positive potential at the output terminal 8, it will be understood that other means may be used having a construction and characteristics such that the output potential at the terminal 8 may be negative. In such event, by connecting the output terminal 8 to the ionizer 5 and connecting the inductor member 7 to ground, negative charges may be delivered to the output terminal 13. It will be further understood, if the terminal of the primary excitation means is positive, that by connecting this terminal to the ionizer 5 and connecting the inductor member 7 to ground positive charges may be delivered to the output terminal 13.

In each of these cases it is necessary that the absolute value of the potential at the terminal 8 and of the bias potential applied to the primary excitation means shall be in inverse relation to each other. For the most part, with primary excitation means utilizing an electronic device which affords convenient means for producing the requisite excitation potential, this inverse relation requires that the electronic device shall effect reversal of the polarity of the bias potential applied to the primary excitation means, it being further necessary that the devices used shall provide for multiplying the potential. It will be understood, moreover, that, when the polarity at the output terminal 8 reversed from that of Fig. 1 is to be provided, in order to secure the desired sensitivity the connection of the source of unidirectional potential difference, such as the battery 43, is made with reversed polarity in the circuit. Generators of this type utilizing electronic devices of conventional construction are available in the market and are particularly used in television.

In Fig. 6 is shown a system similar to that of Fig. 1 in which the regulation of the output potential of an electrostatic generator having conductive conveyors is carried out. In Fig. 6 similar elements to those of Fig. 1 carry the same reference numerals. As shown, the terminal 8 of the primary excitation means 9 is connected to excitation inductor members 49. Conveyors 51 and 53 disposed circumferentially about the axis of rotation in alternate relation to each other are brought into inductive relation to the exciter inductors 49 and then into inductive relation to the output inductor members 55. These output inductors are connected together and connected to the output terminal 13 at —U potential.

In the position shown in Fig. 6, the conveyors 51 in inductive relation to the exciter inductors 49 are connected to ground through the contacts 57 and brushes 58. If the output terminal of the primary excitation means 9 is at positive potential, the inductors 49 being at positive potential, the conveyors 51 will be charged negatively and will carry the charges to the position of the conveyors 53 upon rotation in the direction of the arrow, Fig. 6. In this position of the conveyors in inductive relation to the output inductors 55, these conveyors are connected through the contacts 57 and the brushes 59 and through the lead 61 to the output terminal 13 to deliver to this terminal the negative charges carried by the conveyors; also to the inductors 55 to charge these inductors 55 at negative potential. It will be understood that continued operation of the conductive conveyor generator 48 will deliver negative charges to the output terminal 13 similarly to the operation of the insulating conveyor generator of Fig. 1. The potential regulating devices and the means for multiplying and rectifying the potential in connection with the oscillator and the electronic tube function in the same manner as described in connection with Fig. 1.

In Fig. 7 is shown an arrangement similar to that of Fig. 1, like elements carrying the same reference numerals. In the embodiment of Fig. 7, however, in place of the resistance 29 which in connection with the resistance 27 serves to produce a potential drop across resistance 27 proportional to the output potential difference of the electrostatic generator, the electrostatic device 65 is connected in the circuit between the terminal 13 and the input electrode 5 of the electrostatic generator. This electrostatic device is similar to an electrostatic voltmeter having a rotative element. In the embodiment of Fig. 7 an inductor 67 is connected to the output terminal of the machine, a second inductor 69 is connected through a discharge resistance 71 to ground. The device is provided with a conveyor 73 supported for rotation on an axis into and out of inductive relation to the inductor 67 and then into and out of inductive relation to the inductor 69. In the position of the conveyor 73 this conveyor is connected through the contact 75 and the brush 77 in series with the resistance 27, so that the conveyor in this position may be charged with charges at a positive potential under the influence of the inductor 67 at negative potential.

When the conveyor 73 carried by the rotor driven by the motor 78 is rotated to the position of the conveyor 79, the contact 75 is disconnected from brush 77 and is connected to the brush 81 which is connected to the inductor 69 and to the discharge resistance 71. The positive charges on the conveyor 73 in the position of the conveyor in inductive relation to the inductor 69 are delivered to the inductor 69 and through the resistance 71 to ground. The charge or current passing through the resistance 27 is proportional to the difference of potential between the output terminal 13 and the ground, that is, between the output terminal 13 and the input inductor 5. It will be understood, therefore, that in the embodiment of Fig. 7 the potential of the output terminal 8 of the primary excitation means 9 and of the input inductor 7 of the electrostatic generator 1 will be regulated in response to variations of the output potential difference in the same manner as described in Fig. 1.

Tests carried out by the applicant have shown that an electrostatic generator having an insulating conveyor with input and output electrodes arranged as shown in Fig. 1, of which the cylindrical rotor has a length of 250 mm., a diameter of 140 mm. and an output of 300 watts at 150 kilovolts, may be provided with excitation potential varying between 20 kilovolts and 40 kilovolts for operation between no load and full load. While for certain generating systems the arrangement for potential regulation shown in Fig. 1 is satisfactory, it has been found for a generator of the type referred to requiring between 20 kilovolts and 40 kilovolts for excitation, it is necessary in many cases to introduce between the primary excitation means 9 and the electrostatic generator 1 an electrostatic machine which functions as an amplifier. This amplifying generator may be one which is constructed with conductive conveyors or one which is constructed with a conveyor of insulating material.

To accomplish the desired amplification advantage is taken of the inherent characteristics of an electrostatic generator of either type, that is, one with conductive conveyors or one with a conveyor of insulating material. For a generator of a given construction with respect to the thickness and composition of the insulating conveyor, for example, in Fig. 1, and with respect to the gap between the ionizer and the conveyor, the nature and pressure of the gas in which the generator operates and for a given speed of rotation of the conveyor, the current delivered by the generator is a function of the excitation potential difference. By reference to Fig. 2, for example, in which the output current is plotted against the excitation potential difference, it will be noted that when the excitation potential difference has reached a threshold value at the point 85, Fig. 2, the output current starts to rise slowly from zero and then continues with a steep slope which is substantially rectilinear throughout a substantial range of the output current, the slope of this output current thereafter falling off as the excitation potential is further increased. Thus, it will be apparent between the points 86 and 87 indicating a relatively small increase in an excitation potential that a large change in the output current develops. It will be understood further, if the load device to which the output current is delivered is an ohmic resistance, that the output potential difference will be represented by a curve having the same characteristic as the curve of output current shown in Fig. 2, so that a steep slope and a large rise or decrease of the output potential difference is secured by a small increase or decrease of the excitation potential. These fundamental characteristics remain true whatever may be the polarity of the excitation source. They also remain true whether the excitation source is connected to the input inductor, as in Fig. 1, or is connected between the ionizer and the ground.

In Fig. 8 is shown an electrostatic generating system providing means for regulating the output potential which utilizes an amplifying generator of the type just referred to. In the system of Fig. 8 the output potential at the terminal 13 is negative and the system utilizes as the means producing a flow of current for control a resistance 29 connected in series with the resistance 27 in a circuit connected in parallel with the load 14, as in Fig. 1. The variable tap 31 on resistance 27 is connected through the constant potential constant polarity means 43 to the oscillator 33 of the primary excitation means 9 as in Fig. 1. The output terminal 8 of this means at positive potential is connected to the ionizer 91 of the amplifying generator 90.

This amplifying generator, as shown in Fig. 8, comprises a cylindrical conveyor 93 of insulating material supported for rotation thereof with respect to the input ionizer 91 and the input inductor electrode 95 so as to carry the positive charges transferred to the conveyor from the ionizer 91 to the output ionizer 97 and to the output inductor electrode 99 in opposed relation to the output ionizer. These output electrodes 97, 99 in the embodiment of Fig. 8 are connected to the input inductor electrode 7 of the main electrostatic generator 1 having an insulating conveyor 3. The input inductor 7 thus is charged at a positive potential. The input ionizer 5 of the generator 1 is connected to ground and negative charges are transferred from the ionizer 5 to the conveyor 3 and are delivered to the output ionizer 11 in opposed relation to and connected to the output inductor 12, these output electrodes being connected to the output terminal 13 to deliver the negative charges thereto.

Figs. 9, 10 and 11 in the drawings are disposed respectively opposite to the generators 1, 90 and 9. Fig. 9 shows the curve giving the relation between the amplified excitation potential at the inductor 7 and the output current delivered to the load 14 through the output terminal 13.

Fig. 10 shows the curve giving the relation between the primary excitation potential at the ionizer 91 and the amplified excitation potential at the ionizer 97 and, therefore, at the input inductor electrode 7 of the generator 1. The curves of Figs. 9 and 10 have the same general form for the reasons which have been set forth above.

The curve of Fig. 11 gives the relation between the bias potential which is supplied to the primary excitation means 9 and the primary excitation potential at the output terminal 8 of this primary excitation means. The values of the primary excitation potential are positive in Fig. 11, the values of the bias potential being negative. As shown in Fig. 11, increase in the negative bias potential corresponds to reduction of the positive excitation potential at the output terminal 8 of the primary excitation means 9.

It will be understood from a consideration of the curves in Figs. 9, 10 and 11 that, for the generator 1 requiring a variation in the excitation potential at the input electrodes 5, 7 of between 20 and 40 kilovolts for operation between no load and full load, a variation in the primary excitation potential only of between 15 kilovolts and 15½ kilovolts is required. To accomplish this relatively small change of 500 volts in the potential of the output electrode 8 of the primary excitation means 9, the negative bias potential applied to the grid 19 of the primary excitation means 9, as described in connection with Fig. 1, is only required to be between 20 and 30 volts. Thus, with a variation of a few volts in the potential drop across the control resistance 27 an appreciable variation in the output potential measured in kilovolts is secured by means of the excitation means and the amplifying generator in connection with the main electrostatic generator.

While an ohmic resistance is preferred because it produces an amplification substantially linear throughout the range of useful operation, the load resistance referred to above which produces a characteristic curve of output potential to excitation potential of the same form as the curve of Fig. 2 or Fig. 10, within the scope of the invention a load device of different character and having a different characteristic curve with respect to the output potential and current may be substituted for the resistance. The amplification secured will be a function of a resistance which is equivalent to this load.

It will be understood that a variation in the bias potential applied to the primary excitation means 9 results in a variation in the output potential —U with a certain lag due, on the one hand, to the time necessary for transferring the electrostatic charges between the charge input electrode, such as the ionizer, and the output electrode and terminal 13 and, on the other hand, due to the time necessary to charge and to discharge the useful capacities which are built into the generator structures or the unavoidable parasite capacities, as well as the capacity of the load circuit. This time lag may be made relatively small consistent with the conditions in the majority of cases, in particular when the amplifying generator is utilized in a regulation circuit such as that of Fig. 8.

It is to be noted, for the purpose of reducing the lag, that it is in order that the speed of rotation of the amplifying generator, the number of poles, that is the number of sets of input and output electrodes, be increased; also that the capacities of the discharge circuit be reduced.

For a speed of rotation of 3,000 revolutions per minute and with a two-pole generator, the time of transfer of the charges is of the order of $1/100$ of a second. In accordance with tests which have been made, the following results were obtained with a generator having a conveyor of insulating material in the form of a cylindrical rotor:

| | |
|---|---|
| Rotor diameter | 90 mm. |
| Thickness of cylindrical wall | 2 mm. |
| Length of rotor | 40 mm. |
| Speed of rotation | 2,800 R. P. M. |
| Ambient gas hydrogen under 12 atmospheres' pressure. | |
| Resistivity of the load resistance | 1,000 meg-ohms. |
| Threshold of the primary excitation potential | 14 kv. |
| Useful range of current through the load resistance | 10 to 40 microamperes. |
| Useful range of output potential of the amplifying generator | 10 to 40 kv. |
| Range of the primary excitation potential necessary for the useful range | 15.3 to 16.3 kv. |
| Average slope of the current through the load resistance (potential) | $s=30$ micro-amperes per kv. |
| Average co-efficient of amplification in the useful zone | $k=30$. |

In the embodiments of Figs. 1 and 8 the output potential of the primary excitation means is positive. This results from the usual arrangement of generating means of the type referred to which utilizes a triode or similar electronic tube. Without other provision the potential at the output terminal 13 must be negative in the embodiments of Figs. 1 and 8. In order to make use of the amplifying generator 90, in the embodiment of Fig. 8 the primary excitation potential provided by the primary excitation means 9 must be connected to the input ionizer 91 of the amplifying generator. If it is desired to provide a system in which the potential at the output terminal is positive, it is necessary to modify the system and to introduce additional devices for controlling the polarities.

In Fig. 12 the system includes the main electrostatic generator 1 having input ionizer 5 connected to ground and input inductor 7 connected to the output electrodes 97, 99 of the amplifying generator 90. Having regard to the characteristics of the primary excitation means 9 developing at its output terminal 8 a positive potential, it is necessary in the system of Fig. 12 to connect this output terminal to the input inductor electrode 101 of the amplifying generator 90, the input ionizer 103 of this generator being connected to ground. With this arrangement a positive charge is delivered to the inductor 101 to develop through the input ionizer 103 negative charges on the conveyor of the amplifying generator which are delivered to the ionizer 97 and the output inductor 99 and to the input inductor 7 of the main electrostatic generator 1. Positive charges thereby are transferred through the ionizer 5 to the conveyor 3 of the generator 1 and are carried to the output ionizer 11 and the output inductor 12 and to the output terminal 13 of the system at plus potential.

Under these conditions the potential at the tap 31 of the resistance 27 will be positive. If the connection were made directly from the tap 31 to the primary excitation generator, a positive potential would be applied to the grid 19 of the tube 17 of Fig. 1, which would not secure the proper conditions for operation of this tube and of the multiplying and rectifying devices connected therewith. In the circuit connected between the tap 31 and the input 10 of the primary excitation means 9 at which the bias potential is intended to be applied, it is necessary to introduce means for reversing the polarity and maintaining the desired relation of the potential drop across the resistance 27 to the potential difference between the grid and the cathode of the tube.

To this end, as shown in Fig. 12, an auxiliary electronic tube 105 having cathode 106 and anode 107 is connected in a circuit which includes the battery 109 as the source of the anode positive potential, a load resistance 111 being connected in series in this circuit. As shown in Fig. 12 the cathode 106 is connected to ground. The grid 113 of the tube 105 is connected in the circuit connected to the tap 31 in series with a source of constant unidirectional potential difference, such as the battery 115, the positive terminal of the battery being connected to the tap 31 in order to provide a subtractive potential with respect to the potential drop across the resistance 27.

If the positive potential at the output terminal 13 rises, the potential drop across the resistance 27 will increase, raising the positive potential of the tap 31. The potential at the grid 113 of the tube 105 will become more positive and a greater flow of current in the anode circuit will take place concomitantly with a greater potential drop across the load resistance 111. Since the terminal of the load resistance 111 that is connected to the battery 109 is negative, the negative potential applied at the input terminal 10 of the primary excitation means 9 will be increased with the result, in accordance with the operation of the primary excitation means 9 as described in connection with Fig. 1, that the potential at the output terminal 8 of the primary excitation means 9 will be decreased. The positive potential of the input inductor 101 of the amplifying generator thereby will be decreased and the negative potential of the output electrodes 97, 99 of the amplifying generator and the negative potential of the input inductor 7 of the main generator will be decreased. The positive charges transferred to the conveyor through ionizer 5 will be decreased and the positive potential developed at the output electrodes 11, 12 of the generator 1 and at the output terminal 13 will be decreased, thus offsetting the increase of positive potential which initiated the requirement for regulation.

It will be understood that if the positive potential at the output terminal 13 decreases that the reverse operation takes place and the regulating system of Fig. 12 is effective to increase the output potential and restore it to the desired output potential.

It will be noted in Figs. 8 and 12 that the output electrodes 97, 99 of the amplifying generator are connected to the input inductor electrode of the main electrostatic generator. Under these conditions, with continued operation of the amplifying generator, unless some provision is made for flow of charges from the inductor, the potential difference between its input electrodes 91, 95 or 101, 103 being regulated by the operation of the primary excitation means 9, the potential of the output electrodes 97, 99 and of the inductor 7 will tend continuously to rise. It is necessary, therefore, in order to avoid breakdown in the insulation or discharge between conductive elements of the devices of the system that a resistance 98, 117 be connected between the output electrodes of the amplifying generator and ground so as to provide for sufficient discharge of charges through this resistance when the potential at the output electrode of the amplifying generator reaches a predetermined potential.

A similar leakage resistance 118 is required between the output terminal 8 of the primary excitation means 9 and ground in the embodiment of Fig. 12 where the output terminal 8 is connected to the input inductor 101 of the amplifying generator.

If it were desired to provide a generator the output potential of which could be reversed at will, the system shown in Fig. 12 would require that means be provided for changing the connections from those shown in Fig. 12 if the output terminal were to be negative. On the one hand, the portion of the circuit which includes the electronic tube 105 would be required to be disconnected. On the other hand, the output terminal 8 of the primary excitation generator 9 would be required to be connected to the input ionizer 103 of the amplifying generator instead of being connected to the input inductor 101. Such a change of the connection to the ionizer and inductor would involve connection and disconnection of parts at high potential which it is preferable to avoid. It is desirable, therefore, to utilize a device for changing the polarity which only requires the operation of switching elements at low potential. Two examples of such an arrangement are schematically shown in Figs. 13 and 14.

In Fig. 13 is shown an electrostatic generator having a conveyor 120 of insulating material in the form of a cylinder rotatable on the cylinder axis. A main pair of input electrodes comprising ionizer 121 connected to ground and inductor 123 in opposed relation to each other are disposed at opposite sides of the conveyor wall. In the embodiment of Fig. 13 spaced along the path of movement of the conveyor in the counter-clockwise direction less than 180° from the input electrodes 121, 123, an output ionizer 125 is disposed in opposed relation to and connected to an output inductor 127, these output electrodes being connected to the output terminal 129 of the generator. In the particular embodiment of Fig. 13 the input inductor 123 is maintained at a positive potential by an exciter generator 131 connected between the inductor 123 and ground. Negative charges, therefore, are transferred to the conveyor 120 through ionizer 121 and conveyed thereby from the input ionizer 121 to the output ionizer 125 and delivered to the inductor 127 and to the output terminal 129 in the counter-clockwise rotation of the conveyor 120.

A pair of auxiliary input electrodes comprising ionizer 133 and inductor 135 in opposed relation to each other is disposed circumferentially spaced from the output electrodes 125, 127 in the counter-clockwise direction substantially in the same angular relation to the output electrodes 125, 127 as is the pair of input electrodes 121, 123 at the circumferentially opposite side of the output electrodes.

In the particular embodiment of Fig. 13 diametrically opposite the output electrodes 125, 127 an auxiliary output ionizer 137 and an auxiliary output inductor electrode 139 in opposed relation to each other are disposed between the two pairs of input electrodes. The ionizer 137 is connected to the inductor 139 and is connected through the connection 140 to the auxiliary input inductor electrode 135.

If the conveyor 120 is rotated in the clockwise direction, Fig. 13, the negative charges transferred to the conveyor through the ionizer 121 will be conveyed to the auxiliary output ionizer 137 and to the auxiliary inductor 139 as well as to the auxiliary input inductor 135. These negative charges from the inductor 135 will develop through the ionizer 133 positive charges which are carried by the conveyor in the counter-clockwise rotation thereof to the main output ionizer 125 and to the terminal 129. It will be understood that in such clockwise operation the input electrodes 121, 123 and the auxiliary output electrodes 137, 139 serve with the conveyor as an exciter generator for the portion of the generator which includes the auxiliary input electrode 133, 135 and the main output electrodes 125, 127 in order that the positive polarity shall be secured in the clockwise direction of rotation when the input inductor electrode 123 is excited at positive potential.

Several modifications of the arrangement shown in Fig. 13 are possible. If, for example, the potential supplied by the exciter generator 131 to the inductor 123 is negative, all of the polarities at the respective ionizers, inductors and terminals are changed. Moreover, instead of connecting the exciter generator 131 to the inductor member 123, this exciter generator may be connected to the ionizer 121, the input inductor 123 in such case being connected to ground. In this arrangement, however, the exciter generator must supply the full current of the reversible generator.

It would be possible to arrange the inductors 123, 139, 135 and 127 all at 90° from each other along the circumferential extent of the conveyor, the inductors 127 and 139 and the corresponding ionizers 125, 137 being disposed on one diameter and the inductors 123, 135 and the corresponding ionizers 121, 133 being disposed on a second diameter perpendicular to the first diameter. Having regard to the condition which generally obtains that the potential of the output electrodes 125, 127 will be substantially greater than the potential of the excitation or input inductor 123 or of the auxiliary input inductor 135, it is preferable to dispose the input electrodes with respect to the main and auxiliary output electrodes so that the spaces are proportional to the difference in potential obtaining at the input electrodes as compared with the main output electrodes of the generator. Thus, as shown in Fig. 13, the arcuate spacing $S_1$ between the input or excitation electrodes 121, 123 and the main output electrodes 125, 127 and the arcuate spacing $S_4$ between the auxiliary input electrodes 133, 135 and the main output electrodes 125, 127 are greater than the arcuate spacings $S_2$ and $S_3$ between the input electrodes 121, 123 and the auxiliary output electrodes 137, 139 and between the auxiliary output electrodes 137, 139 and the auxiliary input electrodes 133, 135.

In order to provide for limitation of the potential developed at the auxiliary output electrodes 137, 139 and at the auxiliary input inductor member 135, in the particular arrangement shown in Fig. 13 a discharge resistance 141 is connected between the electrodes 137, 139 and ground. Discharge through the resistance 141 may take place in accordance with Ohm's law to limit the potential of these electrodes. In certain cases, on the other hand, a discharge device having a resistance characteristic not following Ohm's law may be used, so that the curve of potential and current will not be linear. A circuit utilizing in place of resistance 141 means having the characteristic of a glow discharge device may be used. This circuit affects the general characteristic of the generator so that it is possible in this manner to develop the desired characteristic of potential and current at the output terminal 129.

Fig. 14 shows an electrostatic generator having conductive conveyors and capable of functioning in the general manner described in connection with Fig. 13. In Fig. 14 the excitation generator 131 is connected to the input inductor 153 and maintains this inductor member at a positive potential. In the embodiment of Fig. 14 four conveyors are provided disposed about the axis of rotation. The conveyor 151 is in position in inductive relation to the input inductor 153, the conveyor 151 being connected through its contact 155 and the brush 156 to ground so that the conveyor 151 is charged with negative charges. In the position 90° circumferentially counter-clockwise about the axis of rotation the output inductor 157 is disposed connected to the brush 159 and to the terminal 161. In Fig. 14 the conveyor 163 is in inductive relation to the inductor member 157 and through its contact 155 is connected to the brush 159. In this position the negative charges carried by the conveyor in rotating counter-clockwise from the position of conveyor 151 are discharged through the brush 159 to the output inductor 157 and to the output terminal 161.

After such discharge to the terminal 161 the conveyor moves counter-clockwise from the position in inductive relation to the inductor 157 to the position 90° therefrom in which the conveyor 165 is disposed in inductive relation to the inductor 167. In this position the conveyor becomes connected through its contact 155 to the brush 169 connected to ground. As will be clear from a consideration of Fig. 14, in this counter-clockwise direction of rotation the inductor member 167 does not become excited so that the conveyor moving in the third step from the position of the conveyor 165 to the position of the conveyor 171 does not carry substantial charge induced thereon for delivery to the auxiliary output inductor 173 through the contact 155 and the brush 175. Similarly, no build-up of charges or potential is accomplished in the fourth step in the movement of the conveyor from the position of the conveyor 171 to the initial position of the conveyor 151. It thus will be clear in the counter-clockwise rotation of the conveyor under the conditions of Fig. 14 only negative charges will be delivered to the output terminal 161 in the first step of the movement.

When, however, the conveyors are rotated in the clockwise direction, the conveyor 151 carrying negative charges to the position of the conveyor 171 will discharge these negative charges through its contact 155 and the brush 175 to the auxiliary output inductor 173, as well as to the auxiliary input inductor 167. The inductor 167, negatively charged, thus induces positive charges on the conveyor in the position of the conveyor 165 that is connected through its contact 155 to the brush 169. In moving clockwise from the position of the conveyor 165 the conveyor carries these positive charges to the position of the conveyor 163 where it is connected through its contact 155 to the brush 159 and the output inductor 157 and to the output terminal 161. Thus, in the clockwise rotation of the conveyors positive charges are delivered to the output terminal. It will be understood, therefore, that by merely reversing the direction of rotation of the generator of Fig. 14, similarly to that of Fig. 13, a change in the polarity of the output potential is secured.

It will be further understood that instead of charging the main input inductor 153 at positive potential the excitation generator 131 may supply negative potential. In this case all of the polarities of the members will be changed in the respective directions of rotation.

In the generator of Fig. 14 a resistance 141 is provided connected to inductors 173, 167 that are connected together, this resistance being connected to ground to provide, as in Fig. 13, for discharge therethrough to limit the potential of these inductors.

As will be understood from the description to follow a generator of the construction of Fig. 13 may be used as an amplifying generator in a system for regulating the potential of an electrostatic generator in the manner above described. A generator constructed as in Fig. 14 also may be so used.

Fig. 15 shows schematically an arrangement which provides for reversing the polarity of the output potential at will, utilizing a reversible electrostatic generator 180 which may be constructed as described in connection with Figs. 13 or 14. In the embodiment of Fig. 15 the electrostatic generator 180 is constructed in accordance with Fig. 13 and is provided with a cylindrical conveyor 120 of insulating material. In Fig. 15 the corresponding electrodes and connections have the same reference numerals as in Fig. 13 with respect to the electrostatic generator 180. As above indicated, this electrostatic generator 180 serves not only for changing the polarity but in accordance with the operation described in connection with Fig. 8 acts as the amplifying generator for supplying to the main electrostatic generator the requisite high potential across the input electrodes 5, 7 to secure the high output potential at the output electrodes 11, 12 and at the output terminal 13.

In Fig. 15 the load device is indicated at 14 and the flow producing resistance 29, as well as the regulating resistance 27 and its adjustable tap 31 are shown and operate in the same manner as described in connection with Figs. 1 and 8.

The conveyors 3 and 120, respectively, of the generators 1 and 180 in the embodiment of Fig. 15 are driven on a common shaft by the motor 181 controlled by the reversing switch 183. This switch is operatively connected to a reversing switch 185 connected in circuit connected between the tap 31 and the primary excitation means 9 which may be of the same type as the primary excitation means 9 of Fig. 1.

When the output terminal 13 is at a negative potential the reversing switch 185 is operated with its blades upward in contact with the contacts 187, 189, and the circuit is established from the tap 31 through the contact 189 to the hinge contact 191 and thence through the wire 192 to the negative terminal of the constant unidirectional potential device or battery 43. From the positive terminal of this battery connection is made through the wire 193 to the hinge contact 194 of the reversing switch 185 and thence through the contact 187 and wire 195 to the input or bias terminal 10 of the primary excitation means 9. This connection brings a negative potential directly to the bias terminal 10 and, as described in connection with Fig. 1, produces a positive potential at the output terminal 8 of the primary excitation means 9.

In order to produce negative charges at the terminal 13, the conveyor 120 must be rotated in the counter-clockwise direction to convey the negative charges from the main input ionizer 121 to the auxiliary output ionizer 137 and inductor 139 and to the auxiliary input inductor 135, so that the inductor 135 at negative potential in cooperation with the ionizer 133 connected to ground will produce positive charges on the conveyor 120 which are delivered to the ionizer 125 and thence to the input inductor 7 of the main generator, with the result that negative charges are transferred from the ionizer 5 and delivered through the ionizer 11 to the terminal 13. The settings of the reversing switches 183 and 185 and their connection in the circuits, therefore, must be such in relation to each other that the counter-clockwise direction of rotation of the conveyor 120 in Fig. 15 is secured when the switch 185 is in the upper position engaging the contacts 187, 189.

When the switches are operated to the opposite or reversing position so as to reverse the motor 181 and produce clockwise rotation of the conveyor 120, the blades of the switch 185 are in engagement with the lower contacts 197, 199. A circuit is then established from the tap 31, contacts 199, 194, wire 193 to the positive terminal of the constant unidirectional potential means 43 the other terminal of which is connected through the wire 192 to the hinge contact 191 and through the contact 197 to the grid 113 of the electronic tube 105 having cathode 106 and anode 107, as in Fig. 12. As described in connection with Fig. 12, because of the provision of this tube 105 and the load resistance 111, together with the source of anode potential 109, the requisite minus potential may be developed at the input terminal 10 of the primary excitation means 9 when the switch 201 is closed to the contact 202 which is connected to the negative terminal of the source 109.

It will be understood that when the reversing switch 185 is operated to the upper position, Fig. 15, and the switch 183 operated concomitantly to produce counter-clockwise rotation of the conveyor 120 for developing a negative potential at the terminal 13, direct connection of the constant unidirectional potential means 43 to the terminal 10 of the primary excitation means being established, the switch 201 is open to disconnect the devices which include the triode 105 and the source 109 of anode potential and the load resistance 111. When, however, these switches are in the lower position and produce the clockwise rotation of the conveyor 120 developing a positive potential at the terminal 13, the system operates through the electronic tube 105 and its related devices in the same manner as described in connection with Fig. 12 for regulating the positive output potential.

It will be noted that a positive polarity of the terminal 13 of the main generator corresponds to transfer to the output ionizer 125 of the amplifying generator of negative charges deposited on the conveyor 120 by the input ionizer 121. On the other hand, the negative polarity of the output terminal of the main generator corresponds to bringing the ionizers 137, 133 and corresponding inductors 139, 135 into action to reverse the polarity of the negative charges deposited on the conveyor by the input ionizer 121. An inverse arrangement of the amplifying generator with respect to its input ionizers and inductors is possible in which the terminal 8 of the primary excitation means 9 at positive potential may be connected to the ionizer 121, the input inductor 123 being connected to ground. The output terminal 13 of the main generator then would be negative for the clockwise direction of rotation and positive for the counter-clockwise direction of rotation of the amplifying generator conveyor 120. The arrangement as in Fig. 15, however, is preferable. The coefficient of amplification of the amplifying generator corresponding to the counter-clockwise direction of rotation is normally greater than that corresponding to the clockwise direction in the arrangement of Fig. 15.

It is to be noted that the electronic tube 105 itself acts as an amplifier. When the conditions of operation are such that the electronic tube and the devices connected in circuit therewith are utilized in the embodiment of Fig. 15, the conveyor 120 of the amplifying generator being rotated in the clockwise direction, the advantage is secured that the amplification provided by the electronic tube 105 compensates for the deficiency in the amplification of the amplifying generator rotating in the clockwise direction as compared with the amplification of this generator rotating in counter-clockwise rotation, the tube 105 in that case being disconnected and the primary excitation means 9 being directly connected to the tap 31.

As in Fig. 12 the leakage resistances 93 (117) and 118 are provided connected respectively to the output electrodes 125, 127 of the amplifying generator 180 and to the output electrode 8 of the primary excitation means 9. These resistances are connected to ground and function in the same manner as described in connection with Fig. 12.

The two systems which have been described in connection with Figs. 8 and 12 may be arranged in other combinations. It is only necessary to take care that the following three conditions shall be met:

1. The source of constant unidirectional potential, such as the battery 43, 115 must be disposed in such a manner that its potential is opposed to the potential derived from the resistance 27. It is to be noted that this constant potential and constant polarity means 43, 115 may be inserted either in the connection from the tap 31 to the bias input terminal 10 of the primary excitation means or may be connected in series with the resistance 27, as shown at 203 in Fig. 20.

2. The primary excitation means 9 must discharge a current sufficient to permit decreases as well as increases in the primary excitation potential at the output terminal 8 of the excitation means 9 and the discharge should take place within a short period of time. Without such current discharge from the output terminal 8 the potential of this terminal could increase and could not diminish since the capacitance of the members connected to the terminal 8 in the arrangement disclosed have no means for discharging themselves. This discharge current, therefore, must be greater according as:

(a) This capacitance is higher,
(b) The time of response of the system is required to be smaller, and
(c) The variations in the primary excitation potential required of the primary excitation means 9 are larger.

In practice, because of using the amplifying generator, these variations in the primary excitation potential are relatively small, only a few hundred volts. The above mentioned capacitance may be much reduced because of the relatively high frequency of the current supplying the rectifier system described in connection with Fig. 1.

If the primary excitation means 9 is connected to the ionizer of the amplifying generator in the manner shown in Fig. 8, the amplifying generator may discharge a current sufficient to permit the increases and decreases above referred to. A resistance, however, may be connected between the terminal 8 of the primary excitation means 9 and the ground in order to increase the current discharged. If the terminal 8 of the primary generating means, however, is connected to the input inductor of the amplifying generator in the manner shown in Fig. 12 from which inductor the discharge is practically zero, the leakage resistance 118 is indispensible.

3. Since with the apparatus described the primary excitation potential provided at the terminal 8 of the primary excitation means 9 decreases when the negative bias potential at the input terminal 10 of the primary excitation means 9 increases in absolute value, that is becomes more negative, this being the condition in the greater number of the regulating systems of the invention, stable operation is assured only when the output terminal 13 of the main generator is negative. In this case, an increase in the output terminal potential, becoming more negative, resulting in reduction of the primary excitation potential and reduction in the negative potential at the output electrodes of the main generator acts to restore the output potential, that is to decrease its negative numerical value.

A positive polarity at the output terminal of the main generator, on the other hand, requires for counteracting an increase of this output potential that the primary excitation potential shall decrease concomitantly with the bias potential at the input terminal 10 of the primary excitation means 9 becoming less negative, that is, more positive. As has been stated above, for the most part with excitation means utilizing an electronic device this condition makes necessary that the bias potential applied to the primary excitation potential means shall be derived through the intermediary of means reversing the direction of the potential which is measured by the drop across the resistance 27. This means may be an electronic tube and circuit, such as that shown in Fig. 12.

The drop in the output potential between no load and full load, as shown generally in Fig. 4, obtained with a regulating system such as that described above may be relatively small and suitable for most of the conditions to be met. Such drop, for example, may be less than 10%. In any case it is possible to provide a compounding in the system which makes it possible to neutralize this potential drop and even to offset it in such a manner as to provide an increase in the output potential with increase in the current output. This may be referred to as hyper-compounding.

Figure 17:
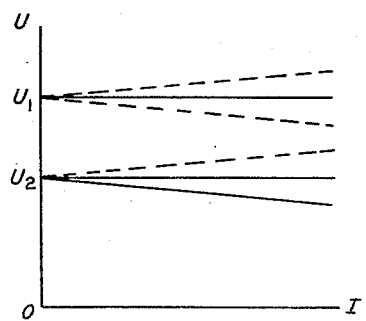
Fig. 17 shows curves indicating different characteristics of the electrostatic generator of the system of Fig. 16 secured by the operation of the regulation modifying and adjusting means.

Fig. 16 shows a system utilizing such compounding. The system of Fig. 16 is similar to that of Fig. 8 with the modification that the lower end of the resistance 27 which is connected to the input ionizer 5 of the main electrostatic generator, instead of being connected directly to ground as in Fig. 8, is connected in Fig. 16 through a compounding device 210 to ground. This compounding device in the embodiment of Fig. 16 is connected to ground and thus is connected in series with the load device 14 which is supplied through the output terminal 13. The current I which flows through the compounding device and the load device 14 in the exterior circuit and through the output terminal 13 is only part of the current which flows through the input ionizer 5, the remainder of this current i flowing, as shown in Fig. 16, through the resistances 27, 29 in the circuit connected to the output terminal. Preferably the compounding device 210 is a variable resistance so that a selected potential drop across this resistance proportional to the current I flowing in the exterior circuit may be obtained. This potential drop opposes the potential drop developed across the resistance 27 between the tap 31 and the terminal of the resistance 27 that is connected to the input electrode 5. The potential at the bias input terminal 10 of the primary excitation means thus is equal to the sum of the potential across the constant potential constant polarity means 43 and the drop across the variable resistance 210 less the drop across the resistance 27. The result is that an increment of the excitation potential that is proportional to the current I is secured. Regulation of the resistance 210 makes it possible to adjust the opposing potential drop and to change the characteristic of the relation of output potential U to output current I, as shown in Fig. 17. Such variation of the resistance 210 causes this characteristic to pivot about a point on the zero ordinate, that is, the ordinate of the potential developed at no load. This potential at no load, however, may have different values U1, U2 depending upon the setting of the tap 31 on the resistance 27.

Fig. 18 shows schematically the apparatus in a commercial embodiment of a system for regulating the output potential of an electrostatic generator having an insulating conveyor, the output terminal of the generator being at negative potential corresponding to the system disclosed in Fig. 16. The various members utilized in the system of Fig. 16 are distributed into three assemblies identified by the Roman numerals I, II, III in Fig. 18.

Assembly I constitutes a motor generator assembly. Within a casing 215, Fig. 18, the main generator 1 having a rotor 3 of insulating material and having four poles consisting of input ionizers 5 connected together by a conductor 217 and input inductors 7 connected by a conductor 219 are disposed for rotation of the conveyor 3 on its axis between the ionizers at one face of the conveyor and the inductors at the other face. The pairs of input ionizers and inductors in the embodiment of Fig. 18 are disposed in diametrically opposite relation to each other.

On a diameter at 90° from the input electrodes 5, 7 the output ionizers 11 are disposed and are connected together by a conductor 221, the respective ionizers 11 being connected to the output inductors 12 disposed in opposed relation to these ionizers at the opposite face of the conveyor 3. The output ionizers 11 are connected through a lead 222 to the output terminal 13 of the generator.

In the embodiment of Fig. 18 the output ionizer 97 of the amplifying generator 90 is connected to the output inductor 99 and to the input inductors 7 of the main generator in the manner disclosed in connection with Fig. 8. The output electrodes of the amplifying generator also are connected to ground through the discharge resistance 98 as in Fig. 8. In this embodiment also, as in Fig. 8, the input inductor 95 of the amplifying generator 90 is connected to ground and the input ionizer 91 is connected to the output terminal 8 of the primary excitation generator 9 of assembly II about to be described.

Within the casing 215 also the flow determining resistance 29 is disposed which is connected through the lead 225 to the output terminal 13 of the main generator and is connected in the manner to be described to the regulating resistance 27 disposed in assembly III in Fig. 18.

As shown in Fig. 18 a motor 227 is mounted on a common shaft with the conveyor 93 of the amplifying generator 90 and with the conveyor 3 of the main generator 1. The motor 227, which may be a 3-phase alternating current motor, is connected to a supply through a suitable control switch 229.

The casing 215 may be constructed to confine a dielectric gas such as hydrogen of high purity under a pressure of the order of 10 to 15 kilograms per square centimeter. The two electrostatic generators thus will operate in this atmosphere for generation of the high potentials desired. Suitable bushings 216 are provided in the walls of the casing 215 through which the leads which extend outside the casing pass, these bushings being in pressure tight relation to the leads and to the casing.

Assembly II constitutes the excitation assembly the elements of which are contained within a casing 231. This casing need not be pressurized. Advantageously, however, it may be disposed close to the casing containing assembly I to which it is connected by the lead 233 connecting between the terminal 8 of the primary excitation means 9, as in Fig. 8, and the input ionizer 91 of the amplifying generator 90. The group of devices for supplying the potential to heat the cathode of the electronic tubes and for supplying the anode potential are diagrammatically shown by the rectangle 235. A constant potential device in the embodiment of Fig. 18 is provided by the gaseous discharge tube 237 having its series resistance 239 connected to the anode, thus giving a small but perfectly constant potential. The group 235 is supplied by leads 238, 239 from one phase of the three phase supply to the motor 227.

Assembly III constitutes the control assembly which, if desired, may be grouped with either of the assemblies I or II or, on the other hand, as shown, may be separate for operation at a distance. In the latter case the connection from this control assembly to the other two assemblies which may be disposed adjacent each other is made through a low potential cable represented diagrammatically in Fig. 18 by the ellipse 241. This cable contains several conductors and may have any desired length.

Assembly III which groups together within casing 240 all the control members comprises a microammeter 245 of the moving wire type reading directly in kilovolts and standardized by adjusting a shunt not shown. This meter indicates continuously the high potential U at the output terminal 13.

The meter 245 is connected in series with the regulating resistance 27 which has its adjustable tap 31 connected through lead 248 to the input terminal 10 of the primary excitation means 9 in assembly II.

A set of resistances 247 is provided, these resistances being connected in parallel with each other and, as a group, in series with the resistance 27, these resistances being selectively connected to the junction 249 by operation of the switch 250. The resistances 247 that are of different values thus may be connected selectively in series also with the resistance 229. These series connected resistances are connected through lead 251 which is contained in cable 241 to the input ionizer 5 of the main generator.

The switch 250 thus may be operated to vary the high potential in steps, the movable tap 31 of the resistance 29 being operated as a vernier to secure progressive regulation in each of the ranges selected by the operation of switch 250.

Assembly III also includes the variable resistance 210 functioning as described in connection with Fig. 16 for securing the compounding above referred to which makes it possible to modify the characteristics in the manner described in connection with Fig. 17. A milliammeter 253 is connected in series with the resistance 210 and carries the current flowing in the exterior circuit through the lead 255 and through the gaseous discharge device 237 of assembly II to ground and then through the outside circuit connected to the terminal 13. It will be understood that the gaseous discharge device 237 operates in the same manner as the constant potential constant polarity means 43 of Fig. 1 when disposed in the manner shown in Fig. 20. As in the embodiment of Fig. 16, the current I flowing through the variable resistance 210 and through the exterior circuit does not include the very small current $i$ flowing through the resistances 27, 29 between the junction 249 and the output terminal 13 of the generator.

Fig. 19 shows partly in section and partly in perspective a commercial form of the apparatus more or less diagrammatically shown in Fig. 18. The assembly I comprises the output terminal 13, the resistance 29 constituted by a series of resistances mounted in an insulating member 261 and wound so that the inner end 263 of this series is connected to the high potential terminal 13 by the conductor 225. This series of resistances is so wound also that as it approaches the exterior of the member 261 and the casing 215 the potential gradually diminishes. This lower potential end at the terminal 267 is connected through the lead 269 and through conductor 242 at low potential contained in cable 275 branched from cable 241 to resistances 27, 247 and 210 at low potential that are disposed in assembly III. Within the casing 215 of assembly I in Fig. 19 also the main generator 1 is disposed, the rotor of this generator being connected to the rotor of the driving motor 227 by the coupling 271.

The amplifying generator 90, as shown in Fig. 19, is mounted within the casing 215 in overhung relation to the motor 227 generally in the manner disclosed in the application of Roger Morel Serial No. 492,494, filed March 7, 1955.

The resistance 98 of assembly I, Fig. 18, also is disposed within the casing 215 of Fig. 19 adjacent the bottom end thereof, the connections of this resistance to ground and to the electrodes 97, 99, Fig. 18, not being shown in Fig. 19.

Assembly I is connected to the switch 229, not shown, through a 3-wire cable 273, Fig. 19, for connecting the motor 227 to the supply. Assembly I also is connected to terminal 8 of assembly II through the lead 233 as shown in Fig. 18. The leads 242 and 243 connecting the resistance 29 and the ionizer 5 of assembly I respectively to the microammeter 245 and to resistance 27 in assembly III are contained in the cable 275, Figs. 18 and 19, branching from cable 241. The cable 277 also branching from the cable 241, Fig. 19, contains the lead 255 connected between the variable resistance 210 in assembly III and the constant potential discharge device 237 in assembly II. Cable 277 also contains the lead 248 connected between the tap 31 and the input terminal 10 of the primary excitation means 9.

The control assembly III, Fig. 19, connected by the cables 241, 275, 277 to the other two assemblies as described carries the kilovolt meter 245 and the milliammeter 253, the voltage range selector switch 250, and the knob 279 for changing positions of the tap 31 of the regulating resistance 27. The other devices of assembly III are indicated by the numeral 63 and represent members which serve to start and to stop the operation of the electrostatic generator and for protection of the devices utilized.

The invention is not limited to the particular embodiments disclosed and modification thereof may be made within the scope of the invention while embodying structures which accomplish the regulation of the output potential in response to variations in this output potential, as well as structures which provide for multiplication and amplification of the variations for securing sensitive regulation, in accordance with the general concepts disclosed in this application. All such modifications are intended to be within the scope of the appended claims.

I claim:

1. In an electrostatic generating system, the combination with an electrostatic generator having a conveyor movable in a given path of movement for conveying electric charges along said path, an output electrode, a pair of input electrodes, said output electrode being disposed adjacent said path of movement and spaced along said path from said input electrodes, said input electrodes being disposed in charge developing relation to each other and to said conveyor in said path for developing on said conveyor charges to be conveyed by said conveyor from said input electrodes to said output electrode concomitantly with developing a difference of potential between said output electrode and a selected one of said input electrodes, of a resistance connected in a circuit connected between said output electrode and said selected input electrode, first means in said circuit connected between said resistance and said output electrode and providing for flow of current through said resistance and a potential drop across said resistance substantially proportional to said output potential difference, second means connected to said resistance and operable for developing a potential difference varying in inverse relation to said potential drop across said resistance, and third means cooperating with said second means for multiplying said inversely related potential difference and producing therefrom a unidirectional potential difference having a predetermined polarity with respect to the polarity of said output electrode, said means producing said unidirectional potential difference being connected to that electrode of said pair of input electrodes which will determine said polarity of said output electrode of said electrostatic generator.

2. In an electrostatic generating system, the combination with an electrostatic generator having a conveyor movable in a given path of movement for conveying electric charges along said path, an output electrode, a charge input electrode, said electrodes being disposed adjacent said path of movement and in spaced relation to each other along said path, an input inductor electrode disposed in charge developing relation to said charge input electrode and to said conveyor for developing on said conveyor charges to be conveyed thereby from said charge input electrode to said output electrode concomitantly with developing a difference of potential between said output electrode and said charge input electrode, of a resistance connected in a circuit connected between said output electrode and said charge input electrode, means in said circuit connected between said resistance and said output electrode and providing for flow of current through said resistance and a potential drop across said resistance substantially proportional to said output potential difference, means connected to said resistance and operable for developing a potential difference varying in inverse relation to said potential drop across said resistance, and means cooperating with said second means for multiplying said inversely related potential difference and producing therefrom a unidirectional potential difference having a predetermined polarity with respect to the polarity of said output electrode, said means producing said unidirectional potential difference being connected to said input inductor electrode of said electrostatic generator to determine the polarity of said output electrode of said electrostatic generator opposite to the polarity of said unidirectional potential difference.

3. In an electrostatic generating system, the combination with an electrostatic generator having a conveyor movable in a given path of movement for conveying electric charges along said path, an output electrode, a charge input electrode, said electrodes being disposed adjacent said path of movement and in spaced relation to each other along said path of movement, an input inductor electrode disposed adjacent said path of movement in charge developing relation to said charge input electrode and to said conveyor for developing on said conveyor charges to be conveyed thereby from said charge input electrode to said output electrode concomitantly with developing a difference of potential between said output electrode and said charge input electrode, of a resistance connected in a circuit connected between said output electrode and said charge input electrode, means in said circuit connected between said resistance and said output electrode and providing for flow of current through said resistance and a potential drop thereacross substantially proportional to said output potential difference, an amplifying generator having an output electrode connected to said input inductor electrode of said electrostatic generator, said amplifying generator having a charge input electrode and an input inductor electrode disposed in charge developing relation to each other, said amplifying generator having a conveyor movable in a predetermined path extending from said input electrodes to said output electrode of said amplifying generator, and means connected to said resistance and operable for developing a unidirectional potential difference varying in inverse relation to said potential drop across said resistance and connected to a selected one of said input electrodes of said amplifying generator for developing in said amplifying generator an amplified unidirectional potential difference applied across said input electrodes of said electrostatic generator so as to increase and decrease the potential difference between said output electrode and said charge input electrode of said electrostatic generator upon decrease and increase of said output potential difference.

4. In an electrostatic generating system, the combination as defined in claim 1 in which said means connected between said resistance and said output electrode is a resistance.

5. In an electrostatic generating system, the combination as defined in claim 1 which comprises a source of constant potential difference connected in series with said resistance and in series with said means for developing said unidirectional potential difference.

6. In an electrostatic generating system, the combination wiith an electrostatic generator having a conveyor movable in a given path of movement for conveying electric charges along said path, an output electrode, a pair of input electrodes, said output electrode being disposed adjacent said path of movement and spaced along said path from said input electrodes, said input electrodes being disposed in charge developing relation to each other and to said conveyor in said path for developing on said conveyor charges to be conveyed by said conveyor from said input electrodes to said output electrode concomitantly with developing a difference of potential between said output electrode and a selected one of said input electrodes, of a resistance connected in a circuit connected between said output electrode and said selected input electrode, means in said circuit connected between said ressitance and said output electrode and providing for flow of current through said resistance and a potential drop across said resistance substantially proportional to said output potential difference, an electronic tube having an anode and a cathode and a grid, means connected to said tube for applying a difference of direct current potential across said anode and said cathode, said grid being connected in a second circuit connected to a selected point on said resistance, means in said second circuit connected in series with said grid for producing undulations of the potential of said grid and of the current flowing through said tube between the anode and cathode thereof, an inductance connected in series with said anode and cathode of said tube and carrying said current flowing through said tube for producing an alternating potential difference across the terminals of said inductance, and rectifying means connected to said terminals of said inductance in a circuit connected across said input electrodes of said electrostatic generator for producing a unidirectional potential difference across said input electrodes.

7. In an electrostatic generating system, the combination as defined in claim 3 in which said means for developing said unidirectional potential difference is connected to said charge input electrode of said amplifying generator.

8. In an electrostatic generating system, the combination as defined in claim 3 in which said means for developing said unidirectional potential difference is connected to said input inductor electrode of said amplifying generator.

9. In an electrostatic generating system, the combination as defined in claim 3 which comprises a load resistance connected between said output electrode of said amplifying generator and a selected one of said input electrodes of said amplifying generator.

10. In an electrostatic generating system, the combination as defined in claim 3 which comprises a leakage resistance connected between said selected one of said input electrodes of said amplifying generator and said charge input electrode of said electrostatic generator.

11. In an electrostatic generating system, the combination with an electrostatic generator having a conveyor of insulating material movable in a given path of movement for conveying electric charges along said path, an output electrode, an input ionizer electrode, said electrodes being disposed adjacent said path of movement and in spaced relation to each other along said path, an input inductor electrode disposed adjacent said path of movement of said conveyor in charge developing relation to said ionizer electrode and to said conveyor for developing on said conveyor charges to be conveyed thereby from said input ionizer electrode to said output electrode concomitantly with developing a difference of potential between said output electrode and said input ionizer electrode, of a resistance connected in a circuit between said input ionizer electrode and said output electrode of said electrostatic generator, means in said circuit connected between said resistance and said output electrode and providing for flow of current through said resistance and a potential drop across said resistance substantially proportional to said output potential difference, an amplifying generator having a conveyor movable in a predetermined path of movement for conveying electric charges along said predetermined path, said amplifying generator having a charge input electrode and an input inductor electrode adjacent said predetermined path in charge developing relation to each other and to said conveyor for developing on said conveyor of said amplifying generator charges to be conveyed thereby, said amplifying generator having a charge output electrode spaced along said predetermined path from said input electrodes of said amplifying generator and being connected to said input inductor electrode of said electrostatic generator, and means connected to said resistance and operable for developing a unidirectional potential difference varying in inverse relation to said potential drop across said resistance and connected to a selected one of said input electrodes of said amplifying generator for developing an amplified unidirectional potential difference between said input electrodes of said electrostatic generator so as to increase and decrease the potential difference between said output electrode and said input ionizer electrode of said electrostatic generator upon decrease and increase of said output potential difference.

12. In an electrostatic generating system, the combination as defined in claim 11 in which said conveyor of said amplifying generator is of insulating material, said charge input electrode of said amplifying generator being provided by an ionizing element disposed adjacent and in spaced relation to a given surface of said insulating conveyor, said charge output electrode of said amplifying generator being provided by an ionizing element disposed adjacent and in spaced relation to said given surface of said conveyor.

13. In an electrostatic generating system, the combination as defined in claim 12 in which said unidirectional potential difference means is connected to said input ionizing element of said amplifying generator.

14. In an electrostatic generating system, the combination as defined in claim 12 in which said unidirectional potential difference means is connected to said input inductor electrode of said amplifying generator.

15. In an electrostatic generating system, the combination with an electrostatic generator having a conveyor movable in a given path of movement for conveying electric charges along said path, a pair of input electrodes, an output electrode, said input electrodes being disposed adjacent a given position of said conveyor in said path of movement, said output electrode being disposed adjacent said given path of movement of said conveyor spaced along said path from said input electrodes, said input electrodes being disposed in charge developing relation to each other and to said conveyor for developing on said conveyor charges to be conveyed thereby from said input electrodes to said output electrode concomitantly with developing a difference of potential between said output electrode and a selected one of said input electrodes of said electrostatic generator, of a resistance connected in a circuit connected between said output electrode and said selected input electrode, means in said circuit connected between said resistance and said output electrode and providing for flow of current through said resistance and a potential drop thereacross substantially proportional to said output potential difference, an amplifying generator having a conveyor movable in a predetermined path of movement for conveying electric charges along said predetermined path, said amplifying generator having a pair of input electrodes disposed adjacent a given point of said predetermined path of its conveyor, said amplifying generator having an output electrode disposed along said predetermined path from said pair of input electrodes of said amplifying generator, said input electrodes of said amplifying generator being disposed in charge developing relation to each other and to said conveyor of said amplifying generator for developing on said amplifying generator conveyor charges to be conveyed from said input electrodes to said output electrode of said amplifying generator, said output electrode of said amplifying generator being connected to the input electrode of said electrostatic generator other than said selected input electrode for developing a potential difference between said input electrodes of said electrostatic generator, and means connected to said resistance and operable for developing a unidirectional potential difference varying in inverse relation to said potential drop across said resistance and connected to a selected one of said input electrodes of said amplifying generator for developing in said amplifying generator an amplified unidirectional potential difference applied across said input electrodes of said electrostatic generator so as to control said potential difference between said output electrode and said selected input electrode of said electrostatic generator, said means for developing said unidirectional potential difference developing said unidirectional potential difference with a polarity of said potential at said selected input electrode of said amplifying generator producing charges on said conveyor of said amplifying generator and charges on the input electrode of said pair of input electrodes of said electrostatic generator other than said selected electrode to produce a predetermined polarity of said output potential difference.

16. In an electrostatic generating system, the combination as defined in claim 15 in which said selected input electrode of said amplifying generator to which said means for developing said unidirectional potential difference is connected is a charge input electrode, said means for developing said unidirectional potential difference developing said unidirectional potential difference at a positive potential at said charge input electrode of said amplifying generator, said charges produced on said amplifying generator conveyor and conveyed to said output electrode of said amplifying generator being positive, said output electrode of said amplifying generator being connected to that input electrode of said electrostatic generator which will develop negative charges on said conveyor of said electrostatic generator to deliver negative charges to said output electrode of said electrostatic generator.

17. In an electrostatic generating system, the combination as defined in claim 15 in which said selected input electrode of said amplifying generator to which said means for developing said unidirectional potential difference is connected is an input inductor electrode, said means for developing said unidirectional potential difference developing said unidirectional potential difference at a positive potential at said input inductor electrode of said amplifying generator, said charges produced on said amplifying generator conveyor and conveyed to said output electrode of said amplifying generator being negative, said output electrode of said amplifying generator being connected to that input electrode of said electrostatic generator which will develop positive charges on said conveyor of said electrostatic generator to deliver positive charges to said output electrode of said electrostatic generator.

18. In an electrostatic generating system, the combination as defined in claim 15 in which said input electrode of said electrostatic generator to which said output electrode of said amplifying generator is connected is an input inductor electrode, said selected input electrode of said amplifying generator to which said means operable for developing a unidirectional potential difference is connected being a charge input electrode, said means for developing said unidirectional potential difference developing said unidirectional potential difference with a positive potential at said charge input electrode of said amplifying generator, said input electrodes of said amplifying generator cooperating to produce positive charges on said conveyor of said amplifying generator that are delivered to said input inductor electrode of said electrostatic generator to produce negative charges on said conveyor of said electrostatic generator that are delivered to said output electrode of said electrostatic generator.

19. In an electrostatic generating system, the combination as defined in claim 15 in which said input electrode of said electrostatic generator to which said output electrode of said amplifying generator is connected is an input inductor electrode, said selected input electrode of said amplifying generator to which said means operable for developing a unidirectional potential difference is connected being an input inductor electrode, said means for developing said unidirectional potential difference developing said unidirectional potential difference with a positive potential at said input inductor electrode of said amplifying generator, said input electrodes of said amplifying generator cooperating to produce negative charges on said conveyor of said amplifying generator that are delivered to said input inductor electrode of said electrostatic generator to produce positive charges on said conveyor of said electrostatic generator that are delivered to said output electrode of said electrostatic generator.

20. An electrostatic generator having a conveyor movable in either direction in a closed path of movement for conveying charges along said path, a main pair of input electrodes disposed adjacent a given point of said path, an output terminal of said generator, a main output electrode connected to said terminal and disposed adjacent said path of movement and spaced along said path in a given direction from said main input electrodes, said main input electrodes being disposed in charge developing relation to each other and to said conveyor at said given point in said path for developing on said conveyor charges of given polarity to be conveyed by said conveyor upon movement thereof in said given direction from a given one of said main input electrodes to said main output electrode and to said terminal concomitantly with developing a difference of potential between said main output electrode and said given main input electrode, said main input electrodes being capable of supporting therebetween a unidirectional charge developing potential difference, a pair of auxiliary input electrodes disposed in charge developing relation to each other and to said conveyor at a position spaced along said closed path from said main input electrodes in the direction opposite to said given direction, an auxiliary output electrode disposed adjacent said path of movement at a position spaced in said opposite direction along said path from said main input electrodes and between said main input electrodes and said auxiliary input electrodes for receiving charges of said given polarity conveyed by said conveyor along said path from said given main input electrode concomitantly with movement of said conveyor in said opposite direction, said auxiliary output electrode being connected to that one of said auxiliary input electrodes which will develop in cooperation with the other auxiliary input electrode charges of polarity opposite to said given polarity on said conveyor to be conveyed by said conveyor to said main output charge electrode and to said terminal upon movement of said conveyor in said opposite direction.

21. An electrostatic generator as defined in claim 20 in which said conveyor is supported for rotational movement thereof in either direction in a circular path of movement about an axis of rotation, said auxiliary output electrode being disposed adjacent said path of movement in an arcuate portion of said path between said two pairs of input electrodes, said arcuate portion being less than the arcuate portions of said path respectively between said main pair of input electrodes and said main output electrode and between said auxiliary pair of input electrodes and said main output electrode.

22. An electrostatic generator as defined in claim 20 in which said conveyor is of insulating material providing a given surface extending along said path of movement of said conveyor, one of said electrodes of said main pair of input electrodes and one of said electrodes of said auxiliary pair of input electrodes being provided by ionizers disposed adjacent and in spaced relation to said given surface of said conveyor, said output electrode being provided by an ionizer disposed adjacent and in spaced relation to said given surface of said conveyor for collecting from said conveyor surface and delivering to said terminal charges developed thereon respectively by said pairs of input electrodes.

23. An electrostatic generator as defined in claim 20 which comprises a leakage circuit connected between said auxiliary output electrode and a member at a selected potential for removing excess charges conveyed by said conveyor to said auxiliary output electrode.

24. An electrostatic generator as defined in claim 23 in which said leakage circuit includes a resistor connected between said auxiliary output electrode and said member at a selected potential.

25. In an electrostatic generating system, the combination as defined in claim 3 in which said amplifying generator is provided with a pair of auxiliary input electrodes disposed in charge developing relation to each other and to said amplifying generator conveyor adjacent a point in said predetermined path spaced along said path from said charge input electrode of said amplifying generator in the direction opposite to said movement of said conveyor from said charge input electrode of said amplifying generator toward said output electrode thereof, said amplifying generator having an auxiliary output electrode disposed adjacent said predetermined path of movement at a point in said predetermined path between said charge input electrode of said amplifying generator and said pair of auxiliary input electrodes thereof for receiving charges conveyed by said conveyor from said charge input electrode of said amplifying generator along said predetermined path in said opposite direction of movement of said conveyor, said auxiliary output electrode being connected to a selected one of said auxiliary input electrodes for developing at said auxiliary input electrodes upon said movement of said conveyor in said opposite direction charges on said conveyor of said amplifying generator of opposite sign to those developed on said conveyor by said charge input electrode and said input inductor electrode of said amplifying generator, whereby charges of opposite signs are delivered to said input inductor electrode of said electrostatic generator in accordance with the two directions of movement of said conveyor of said amplifying generator.

26. In an electrostatic generating system, the combination as defined in claim 25 in which said means connected to said resistance and operable for developing a unidirectional potential difference comprises switching means operable to two positions corresponding respectively to negative and positive polarities at the point of connection to said resistance, and supplemental means connected to said resistance in a given position of said switching means and disconnected therefrom in the other position of said switching means, said supplemental means being operative for said given position of said switching means for maintaining the polarity of said unidirectional potential difference the same as the polarity of said unidirectional potential difference for the other position of said switching means so as to maintain the polarity of said selected input electrode of said amplifying generator.

27. In an electrostatic generating system, the combination as defined in claim 26 which comprises a motor operatively connected to said conveyor of said amplifying generator and operable forwardly and reversely to effect said movement of said conveyor of said amplifying generator in said two directions, and a reversing switch connected in circuit with said motor and operatively connected to said switching means for effecting reversal of said motor concomitantly with operation of said switching means respectively to said two positions.

28. In an electrostatic generating system, the combination as defined in claim 3 which comprises a load circuit connected between said output electrode and said charge input electrode of said electrostatic generator, said load circuit comprising a resistance connected to said charge input electrode in series with the load of said circuit and between said load and said charge input electrode.

29. In an electrostatic generating system, the combination as defined in claim 28 in which said resistance in said load circuit is a variable resistance.

30. In an electrostatic generating system, the combination as defined in claim 3 in which said resistance is adjustable to adjust said unidirectional potential difference for adjusting the potential difference between said input electrodes of said electrostatic generator.

31. In an electrostatic generating system the combination as defined in claim 3, which comprises a leakage resistance connected between said output electrode of said amplifying generator and said charge input electrode of said amplifying generator.

32. In an electrostatic generating system the combination with an electrostatic generator having a conveyor, an output electrode, an input electrode, said conveyor and said electrodes being supported for movement of said conveyor and said electrodes relative to each other in a given path of movement for conveying electric charges carried by said conveyor along said path, said input and output electrodes being disposed adjacent said path of movement and spaced along said path from each other, said electrodes being disposed in charge transferring relation to said conveyor for transferring to and removing from said conveyor said charges conveyed by said conveyor concomitantly with developing a difference of unidirectional potential between said output electrode and said input electrode, of a load circuit connected between said output electrode and said input electrode, means connected to said load circuit and providing a unidirectional potential difference substantially proportional to the difference of potential between said output electrode and said input electrode, an exciter electrode disposed adjacent said conveyor and when excited cooperating with said input electrode to support the transfer of charges to said conveyor to be conveyed by said conveyor, means connected to said proportional potential difference means and to said exciter and input electrodes and operable in response to variations in said proportional potential difference to vary the potential difference between said exciter electrode and said input electrode inversely with respect to the variation of the potential difference between said output electrode and said input electrode, and means operatively connected to said last means and to said exciter electrode and operable to determine the polarity of said exciter electrode the reverse of the polarity of said output electrode.

33. An electrostatic generator as defined in claim 20 in which said conveyor is supported for rotational movement thereof in either direction in a circular path of movement about an axis of rotation.

References Cited in the file of this patent

UNITED STATES PATENTS

| | | |
|---|---|---|
| 2,588,081 | Bousman | Mar. 4, 1952 |
| 2,588,613 | Burrill et al. | Mar. 11, 1952 |